(12) United States Patent
Sawabe

(10) Patent No.: US 10,999,170 B2
(45) Date of Patent: May 4, 2021

(54) COMMUNICATION SYSTEM, AVAILABLE-BANDWIDTH ESTIMATION METHOD, AND RECORDING MEDIUM

(71) Applicant: NEC Corporation, Tokyo (JP)

(72) Inventor: Anan Sawabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 410 days.

(21) Appl. No.: 16/089,671

(22) PCT Filed: Mar. 21, 2017

(86) PCT No.: PCT/JP2017/011100
§ 371 (c)(1),
(2) Date: Sep. 28, 2018

(87) PCT Pub. No.: WO2017/169948
PCT Pub. Date: Oct. 5, 2017

(65) Prior Publication Data
US 2020/0313992 A1  Oct. 1, 2020

(30) Foreign Application Priority Data

Mar. 30, 2016 (JP) ............................. JP2016-067219

(51) Int. Cl.
*H04L 12/26* (2006.01)
(52) U.S. Cl.
CPC ...... *H04L 43/0858* (2013.01); *H04L 43/0894* (2013.01)
(58) Field of Classification Search
CPC .................................................. H04L 43/08
See application file for complete search history.

(56) References Cited

U.S. PATENT DOCUMENTS

2015/0036534 A1  2/2015 Oshiba
2015/0180757 A1  6/2015 Oshiba

FOREIGN PATENT DOCUMENTS

| JP | 2015-164275 A | 9/2015 |
| WO | 2013/111236 A1 | 8/2013 |
| WO | 2014/017140 A1 | 1/2014 |

OTHER PUBLICATIONS

Qiang Wang et al., "FEAT: Improving Accuracy in End-to-end Available Bandwidth Measurement," GLOBECOM '06, IEEE, Dec. 1, 2006, pp. 1-4.

(Continued)

*Primary Examiner* — Kent Krueger

(57) ABSTRACT

A communication system according to the present invention includes: a transmission-side apparatus that transmits a packet train composed of a plurality of estimation packets for estimating an available bandwidth; and a reception-side apparatus that receives the packet train, stores one or more lower-limit expansion ideal curves, one or more in-range ideal curves, and one or more upper-limit expansion ideal curves; calculates an actual amount of increase in delay occurring in the respective estimation packets based on a reception time of the estimation packet; selects an ideal curve most similar to the increase tendency of a delay indicated by the calculated amount of increase in delay, from among the lower-limit expansion ideal curve, the in-range ideal curve, and the upper-limit expansion ideal curve; and estimates the available bandwidth, based on a selection result on the ideal curve.

9 Claims, 14 Drawing Sheets

(56) References Cited

OTHER PUBLICATIONS

Anup Kumar Paul et al., "NEXT: New Enhanced Available Bandwidth Estimation Technique for End-to-End Network Path," IEICE Technical Report CQ2014-1, Apr. 2014, pp. 1-5.
Van Jacobson, "pathchar—a tool to infer characteristics of Internet paths," ftp://ftp.ee.lbl.gov/pathchar/msri-talk.pdf, Apr. 21, 1997, pp. 1-21.
Written Opinion of the International Searching Authority of PCT/JP2017/011100 dated Jun. 6, 2017.
International Search Report of PCT/JP2017/011100 dated Jun. 6, 2017.

Fig. 13A                                              RELATED ART
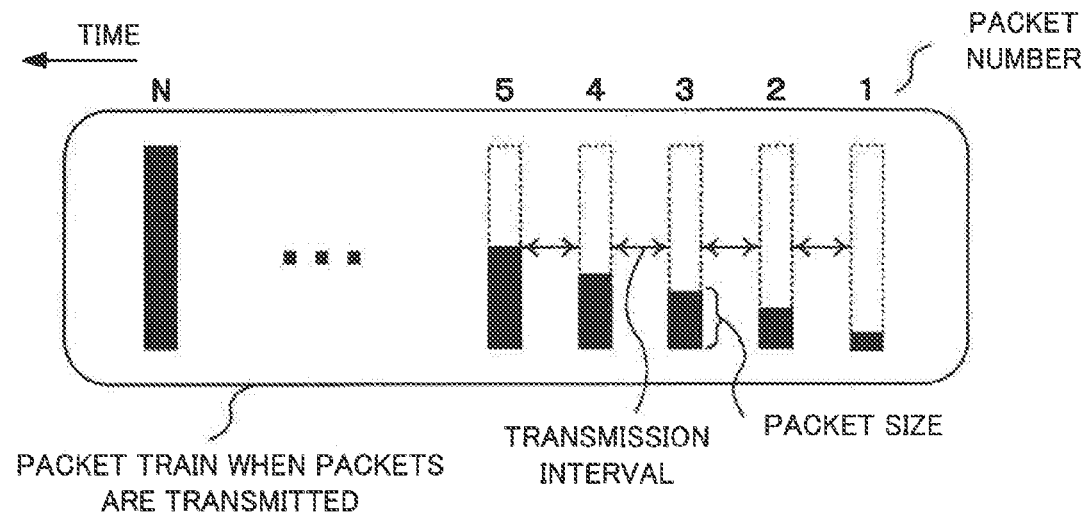
Fig. 13B                                              RELATED ART
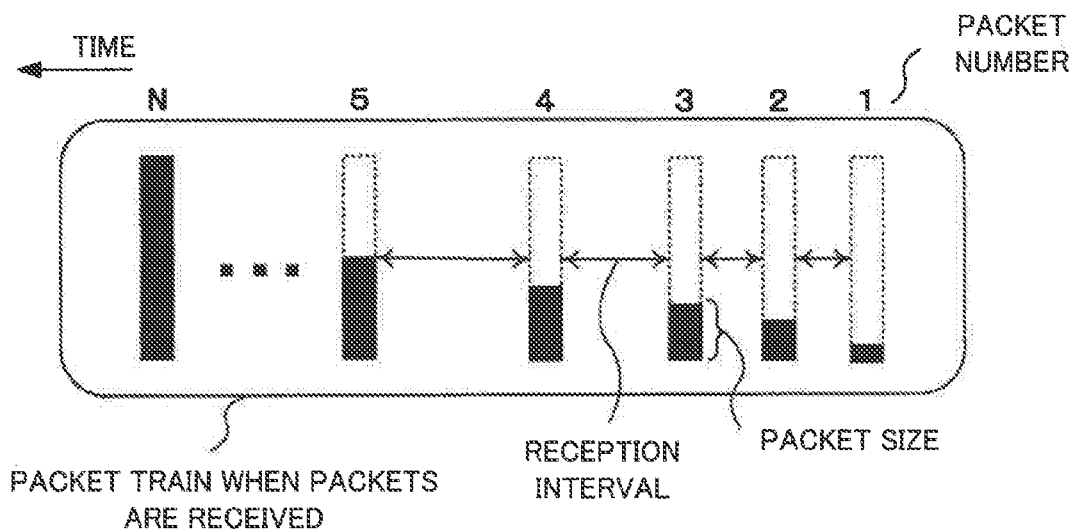

COMMUNICATION SYSTEM, AVAILABLE-BANDWIDTH ESTIMATION METHOD, AND RECORDING MEDIUM

CROSS REFERENCE TO RELATED APPLICATIONS

This application is a National Stage of International Application No. PCT/JP2017/011100 filed Mar. 21, 2017, claiming priority based on Japanese Patent Application No. 2016-067219 filed Mar. 30, 2016, the disclosure of which is incorporated herein in its entirety by reference.

TECHNICAL FIELD

The present invention relates to a communication system, an available-bandwidth estimation method, and an available bandwidth a medium for estimating an available bandwidth being a vacant bandwidth of a communication line.

BACKGROUND ART

An available bandwidth of a communication bandwidth (also called a "usable bandwidth") is a vacant bandwidth acquired by subtracting, from a physical bandwidth of a bottleneck link of a communication line, other traffic flowing through a network (hereinafter referred to as "cross traffic"). For example, when a physical bandwidth of a bottleneck link of a communication line is 100 Mbps, and cross traffic is 30 Mbps, an available bandwidth becomes: 100−30=70 Mbps.

Estimating a current available bandwidth is particularly important, when an application requiring traffic having a high real-time property, such as a video chat, a videophone, or a teleconference, in that is transmitted bi-directionally between terminals for communication is employed. By estimating an available bandwidth, it is possible to suppress a transmission rate of video to be equal to or below an estimated value of an available bandwidth. Then, it becomes possible to prevent packet loss due to an excess of a sum of a transmission rate of video and cross traffic over a physical bandwidth of a bottleneck link of a communication line. Consequently, it becomes possible to secure video quality.

For example, there is a method described in PTL 1 in relation to an estimation technique of an available bandwidth. In the following, the method described in PTL 1 is described with reference to FIG. 13A, FIG. 13B and FIG. 14.

FIG. 13A is an explanatory diagram illustrating a manner of transmitting a packet train in a transmission-side apparatus by the method described in PTL 1. FIG. 13B is an explanatory diagram illustrating a manner of receiving a packet train in a reception-side apparatus by the method described in PTL 1. FIG. 13A illustrates a manner of transmitting a packet train in a transmission-side apparatus, and FIG. FIG. 13B illustrates a manner of receiving a packet train in a reception-side apparatus.

As illustrated in FIG. 13A, in the method in PTL 1, a transmission-side apparatus transmits, to a reception-side apparatus, a plurality of packets in which a transmission interval of respective packets is equal distant, and a packet size gradually increases, as one group (unit), for estimating an available bandwidth. Hereinafter, a plurality of packets to be transmitted as one group for estimating an available bandwidth are referred to as a packet train. Further, hereinafter, respective packets included in a packet train may be referred to as estimation packets.

In the example illustrated in FIG. 13A, a transmission-side apparatus transmits a packet train composed of N estimation packets to a reception-side apparatus. On the other hand, as illustrated in FIG. 13B, in the method in PTL 1, a reception-side apparatus receives estimation packets transmitted from the transmission-side apparatus, and estimates an available bandwidth by detecting a change in reception interval of the respective estimation packets.

By the above-described packet train transmission method by a transmission-side apparatus, a transmission rate of respective estimation packets within a packet train linearly increases. Note that, herein, it is assumed that a transmission rate of an estimation packet is a value acquired by dividing a packet size of the estimation packet by a packet transmission interval of a packet train. However, in case of that a transmission rate of an estimation packet exceeds an available bandwidth of the network when a packet train passes through a network, a packet is temporarily queued in a communication device such as a router and a switch on the network. Then, a queuing delay occurs for the estimation packet.

When a queuing delay occurs for an estimation packet, as illustrated in FIG. 13B, in a reception-side apparatus, a reception interval of estimation packets increases, at one of timings, more than a transmission interval in a transmission-side apparatus. The method described in PTL 1 estimates an available bandwidth by using a property that a reception interval increases due to a queuing delay as described above. More specifically, a reception-side apparatus detects a point where a reception interval of estimation packets within a packet train starts to increase quadratic-functionally, as compared with a transmission interval in a transmission-side apparatus, and calculates a transmission rate of an estimation packet associated with the point, as an estimated value of an available bandwidth.

FIG. 14 is a sequence diagram illustrating a manner of transmitting and receiving respective estimation packets within a packet train by the method described in PTL 1. As illustrated in FIG. 14, it is assumed that a transmission time of an i-th packet (where i=1, 2, . . . , and N) in a transmission-side apparatus is S(i), and a reception time of the i-th packet in a reception-side apparatus is R(i). At this occasion, in the method described in PTL 1, a queuing delay of the i-th packet (where i=2, 3, . . . , and N) is calculated by using the following Equation (1).

$$Q(i)=\{R(i)-R(1)\}-\{S(i)-S(1)\} \qquad \text{Equation (1)}$$

Specifically, an i-th queuing delay Q(i) within a packet train is a value acquired by subtracting, from an elapsed time eR(i) from a point of time when a first packet is received until the i-th packet is received by a reception-side apparatus, an elapsed time eS(i) from a point of time when the first packet is transmitted until the i-th packet is transmitted by a transmission-side apparatus. Note that eR(i)=R(i)−R(1), and eS(i)=S(i)−S(1).

Note that, in the method described in PTL 1, an "ideal curve" acquired by combining a horizontal straight line and a parabolic curve is prepared by a number equal to a number of packets. Specifically, (an ideal curve when a queuing delay occurs in a head packet, an ideal curve when a queuing delay occurs in a second packet, . . . , and an ideal curve when a queuing delay occurs in a tail packet) are prepared. Further, in the method described in PTL 1, a shape of an ideal curve is determined as follows. Specifically, since a queuing does not occur when a transmission rate per estimation packet is lower than an available bandwidth, a queuing delay becomes 0. On the other hand, since an estimation packet stays in a queue of a router being a bottleneck when a transmission rate per estimation packet exceeds an available bandwidth, a queuing delay is accumulated and rises in a parabolic shape.

Further, regarding an available bandwidth estimation technique using a packet train, NPLs 1 and 2 describe a method in which, estimation accuracy is enhanced by enhancing resolution of a part of a search range, when an available bandwidth is estimated. For example, NPL 1 describes a method in which, in order to implement a zone having high resolution from a head packet to a tail packet of a packet train being a search range, a number of packets associated with the zone of the packet train is increased in a transmission-side apparatus. Note that, also by the method described in NPL 2, a large number of estimation packets are transmitted for a portion where granularity is intended to increase by shortening a transmission interval.

Further, a method described in NPL 3 is a method for estimating not an available bandwidth but a physical bandwidth, and is called a single packet method. Specifically, the method described in NPL 3 is a method in which a one-way delay of respective packets is observed by transmitting and receiving one packet a plurality of times. When cross traffic is not present during packet transmission, only a transmission delay in a physical bandwidth occurs. Further, when cross traffic is present, not only a transmission delay but also a delay by queuing occur. As a result of observing a one-way delay of a plurality of packets, only a transmission delay is included in the one-way delay when the delay is smallest. Therefore, a physical bandwidth is acquired as an estimation result.

CITATION LIST

Patent Literature

[PTL 1] International Publication No. WO2014/017140

Non Patent Literature

[NPL 1] Qiang Wang and Liang Cheng, "FEAT: Improving Accuracy in End-to-end Available Bandwidth Measurement," GLOBECOM '06, IEEE, Dec. 1, 2006, p. 1-4.
[NPL 2] Anup Kumar Paul, et al., "NEXT: New Enhanced Available Bandwidth Estimation Technique for End-to-End Network Path," IEICE Tech. report CQ2014-1.
[NPL 3] Van Jacobson, "pathchar—a tool to infer characteristics of Internet paths," ftp://ftp.ee.lbl.gov/pathchar/msri-talk.pdf, Apr. 21, 1997.

SUMMARY OF INVENTION

Technical Problem

An issue is that estimation accuracy of an available bandwidth is deteriorated, when a true value of the available bandwidth falls outside a transmission rate range by an estimation packet of a packet train.

For example, in the methods described in PTL 1, and NPLs 1 and 2, a search range of an available bandwidth is limited to a transmission rate range by an estimation packet of a packet train. More specifically, a case where a queuing delay occurs in a head packet corresponds to a search lower limit of an available bandwidth, and a case where a queuing delay occurs in a tail packet corresponds to a search upper limit of the available bandwidth. For example, when a transmission rate range by an estimation packet of a packet train is from 10 Mbps (search lower limit) to 20 Mbps (search upper limit), and when a true value of an available bandwidth is 5 Mbps, an estimated value of the available bandwidth by the above-described methods becomes 10 Mbps, which is the search lower limit. In this way, in the methods described in PTL 1, and NPLs 1 and 2, there is an issue that estimation accuracy of an available bandwidth may be deteriorated, when a true value of the available bandwidth falls outside a search range.

Further, in the method described in PTL 3, it is necessary to perform a large amount of transmission and reception of packets alone, and specify an observation result in which a delay is smallest among the observation results. Therefore, not only a large communication load is applied, but also it takes time for estimation.

In view of the above, an object of the present invention is to provide a communication system, an available-bandwidth estimation apparatus, an available-bandwidth estimation method, and an available-bandwidth estimation program that enable to accurately estimate an available bandwidth in a short time and with a low load.

Solution to Problem

A communication system according to one aspect of this disclosure includes:
a transmission-side apparatus that transmits a packet train composed of a plurality of estimation packets for estimating an available bandwidth; and
a reception-side apparatus that receives the packet train, wherein
the reception-side apparatus includes:
a memory; and
at least one processor couple to the memory,
the processor performing operation, the operations includes:
receiving the packet train;
storing
information indicating one or more lower-limit-expansion-ideal-curves expressing an increase tendency of a delay occurring in the estimation packet by using a queuing delay, when a true value of the available bandwidth falls below a transmission rate range being a range of a transmission rate of the estimation packet,
information indicating one or more in-range-ideal-curves expressing an increase tendency of a delay occurring in the estimation packet by using a serialization delay and a queuing delay, when a true value of the available bandwidth falls within the transmission rate range, and
information indicating one or more upper-limit-expansion-ideal-curves expressing an increase tendency of a delay occurring in the estimation packet by using a serialization delay, when a true value of the available bandwidth falls above the transmission rate range;
calculating an actual amount of increase in delay occurring in the respective estimation packets, based on a reception time of the estimation packet;
selecting an ideal curve most similar to the increase tendency of a delay indicated by the calculated amount of increase in delay, from among the lower-limit-expansion-ideal-curve, the in-range-ideal-curve, and the upper-limit-expansion-ideal-curve; and
estimating the available bandwidth, based on a selection result on the ideal curve.

An available-bandwidth estimation apparatus according to one aspect of this disclosure includes:
a memory; and at least one processor coupled to the memory, the processor performing operation. The operations includes:

estimating an available bandwidth, based on information indicating a configuration of a packet train composed of a plurality of estimation packets for estimating an available bandwidth, and information on a reception time of the respective estimation packets when the packet train is received. The operations further includes storing information indicating one or more lower-limit-expansion-ideal-curves expressing an increase tendency of a delay occurring in the estimation packet by using a queuing delay, when a true value of the available bandwidth falls below a transmission rate range being a range of a transmission rate of the estimation packet, information indicating one or more in-range-ideal-curves expressing an increase tendency of a delay occurring in the estimation packet by using a serialization delay and a queuing delay, when a true value of the available bandwidth falls within the transmission rate range, and information indicating one or more upper-limit-expansion-ideal-curves expressing an increase tendency of a delay occurring in the estimation packet by using a serialization delay, when a true value of the available bandwidth falls above the transmission rate range;

calculating an actual amount of increase in delay occurring in the respective estimation packets, based on a reception time of the estimation packet;

selecting an ideal curve most similar to the increase tendency of a delay indicated by the calculated amount of increase in delay, from among the lower-limit-expansion-ideal-curve, the in-range-ideal-curve, and the upper-limit-expansion-ideal-curve; and estimating the available bandwidth, based on a selection result on the ideal curve.

An available-bandwidth estimation method for an information processing device according to one aspect of this disclosure includes:

storing information indicating one or more lower-limit-expansion-ideal-curves expressing an increase tendency of a delay occurring in an estimation packet by using a queuing delay, when a true value of the available bandwidth falls below a transmission rate range being a range of a transmission rate of the estimation packet included in a packet train composed of a plurality of estimation packets for estimating an available bandwidth, information indicating one or more in-range-ideal-curves expressing an increase tendency of a delay occurring in the estimation packet by using a serialization delay and a queuing delay, when a true value of the available bandwidth falls within the transmission rate range, and information indicating one or more upper-limit-expansion-ideal-curves expressing an increase tendency of a delay occurring in the estimation packet by using a serialization delay, when a true value of the available bandwidth falls above the transmission rate range, selecting an ideal curve most similar to the increase tendency of a delay occurring in the estimation packet indicated by an actual amount of increase in delay occurring in the respective estimation packets to be calculated based on a reception time of the estimation packet, from among the lower-limit-expansion-ideal-curve, the in-range-ideal-curve, and the upper-limit-expansion-ideal-curve; and estimating the available bandwidth, based on a selection result on the ideal curve.

A non-transitory computer-readable recording medium according to one aspect of this disclosure embodies an available-bandwidth estimation program. The available-bandwidth estimation program causing a computer to perform a method. The method includes:

storing information indicating one or more lower-limit-expansion-ideal-curves expressing an increase tendency of a delay occurring in an estimation packet by using a queuing delay, when a true value of the available bandwidth falls below a transmission rate range being a range of a transmission rate of the estimation packet included in a packet train composed of a plurality of estimation packets for estimating an available bandwidth, information indicating one or more in-range-ideal-curves expressing an increase tendency of a delay occurring in the estimation packet by using a serialization delay and a queuing delay, when a true value of the available bandwidth falls within the transmission rate range, and information indicating one or more upper-limit-expansion-ideal-curves expressing an increase tendency of a delay occurring in the estimation packet by using a serialization delay, when a true value of the available bandwidth falls above the transmission rate range;

selecting an ideal curve most similar to the increase tendency of a delay occurring in the estimation packet indicated by an actual amount of increase in delay occurring in the respective estimation packets to be calculated based on a reception time of the estimation packet, from among the lower-limit-expansion-ideal-curve, the in-range-ideal-curve, and the upper-limit-expansion-ideal-curve; and estimating the available bandwidth, based on a selection result on the ideal curve.

Advantageous Effects of Invention

According to the present invention, it is possible to accurately estimate an available bandwidth in a short time and with a low load.

BRIEF DESCRIPTION OF DRAWINGS

FIG. 13A is an explanatory diagram illustrating a transmitting method described in PTL 1.

FIG. 13B is an explanatory diagram illustrating a receiving method described in PTL 1.

EXAMPLE EMBODIMENT

Figure 1:
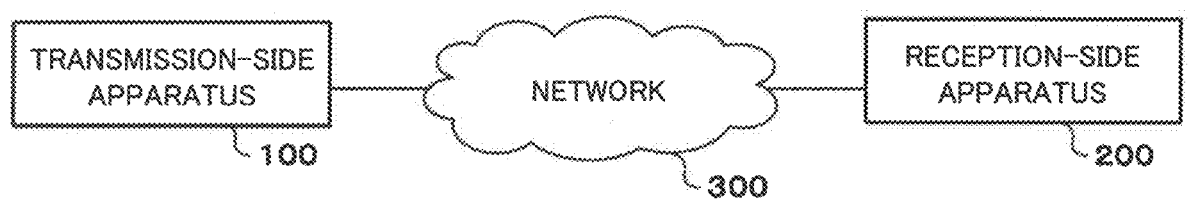
FIG. 1 is a configuration diagram illustrating an example of a communication system in a first example embodiment.

In the following, example embodiments of the present invention are described with reference to the drawings.

First of all, a concept of the present invention is briefly described. The present invention employs a packet train method in order to enable estimation in a short time and with a low load. In addition to the above, the present invention expands a search range for calculating an estimated value of an available bandwidth, as compared with a transmission rate range by an estimation packet of a packet train, without changing a structure of a packet train.

A transmission-side apparatus transmits a packet train composed of an estimation packet sequence, in which a packet size gradually (specifically, linear functionally) increases, and a transmission interval is equal distant, similarly to the method described in PTL 1.

A reception-side apparatus receives an estimation packet transmitted from the transmission-side apparatus, and records a reception time of the received estimation packet. Further, the reception-side apparatus compares an increase tendency of a delay indicated by a reception time of respective estimation packets with an ideal curve prepared in advance. Further, the reception-side apparatus estimates an available bandwidth, based on information on a location where it is assumed that a queuing delay starts to occur in an idea curve most similar to the increase tendency of the delay. When an ideal curve is generated, the reception-side apparatus expands a search range, as compared with a transmission rate range by an estimation packet of a packet train, by considering not only a queuing delay occurring in a bottleneck router but also a serialization delay of respective estimation packets. Generally, when estimating an available bandwidth by using a packet train, a range in which the available bandwidth is searched is limited to a transmission rate range to be acquired from a size of an estimation packet of the packet train, and a transmission interval. In the present invention, a transmission rate range of an estimation packet to be set by a packet train may be referred to as a search range by a packet train, or a transmission rate range.

A serialization delay increases, as a packet size increases. In the present invention, a search range of an available bandwidth is expanded by using an ideal curve ideally expressing an increase tendency of a delay including not only a queuing delay occurring in an estimation packet, but also an increment of serialization delay.

For example, when a true value of an available bandwidth falls below a lower limit of a search range by a packet train, a transmission rate of a head packet already exceeds the available bandwidth. Therefore, an influence of a queuing delay occurs at a reception time of all estimation packets within a packet train. In view of the above, the reception-side apparatus calculates an increase tendency of an ideal queuing delay at the time when it is assumed that a packet is transmitted before a head packet of a packet train, and a queuing delay starts to extend in one of the packets, as a "virtual ideal curve". Further, the reception-side apparatus enables to estimate even if an available bandwidth falls below a search lower limit, by adding a virtual ideal curve as described above to an ideal curve as a comparison target of an increase tendency indicated by observation data.

Further, for example, when a true value of an available bandwidth falls above an upper limit of a search range by a packet train, a transmission rate of respective packets from a head packet to a tail packet does not exceed the available bandwidth. Therefore, an influence of a serialization delay occurs at a reception time of all estimation packets within a packet train. In view of the above, the reception-side apparatus calculates an increase tendency of an ideal serialization delay at the time when it is assumed that a packet after a tail packet of a packet train is transmitted, and a queuing delay starts to extend in one of the packets, as a "virtual ideal curve". Further, the reception-side apparatus enables to estimate even if an available bandwidth falls above a search upper limit, by adding a virtual ideal curve as described above to an ideal curve as a comparison target of an increase tendency indicated by observation data.

In this way, in the present invention, a delay affecting an increase in delay of an estimation packet is classified into a serialization delay and a queuing delay. Further, an ideal curve expressing an ideal increase tendency of a serialization delay occurring in respective estimation packets is prepared by assuming that a true value falls outside a search range by a packet train. Thus, it is possible to enhance estimation accuracy of an available bandwidth without limiting an estimation range of the available bandwidth to a search range by a packet train.

Further, in the present invention, even when a true value of an available bandwidth falls within a search range, estimation accuracy of an available bandwidth is enhanced. This is because an ideal curve depending on a more actual condition is calculated after classifying types of delay affecting a delay into a serialization delay, and a queuing delay with respect to an estimation packet before the bandwidth exceeds the true value and an estimation packet after the bandwidth exceeds the true value.

First Example Embodiment

Next, a first example embodiment of the present invention is described. FIG. 1 is a configuration diagram illustrating an example of a communication system in the first example embodiment. As illustrated in FIG. 1, a communication system in the present example embodiment includes a transmission-side apparatus 100 and a reception-side apparatus 200. Further, the transmission-side apparatus 100 and the reception-side apparatus 200 are connected by a network 300 as a calculation target of an available bandwidth.

The transmission-side apparatus 100 and the reception-side apparatus 200 may be respectively apparatus having a function of transmitting and receiving information to and from an external apparatus; and may be, for example, a personal computer (PC), a portable computer (PDA), a mobile phone, a smartphone, a tablet terminal, a fixed-line phone, a street multimedia terminal, a vehicle-mounted terminal, a television with a network connection function, a set-top box with a network connection function, a game machine, a printer with a network connection function, a scanner with a network connection function, and another similar apparatus.

Further, the network 300 may be connected to an apparatus other than the transmission-side apparatus 100 and the reception-side apparatus 200, and cross traffic may flow among these apparatuses.

Figure 2:
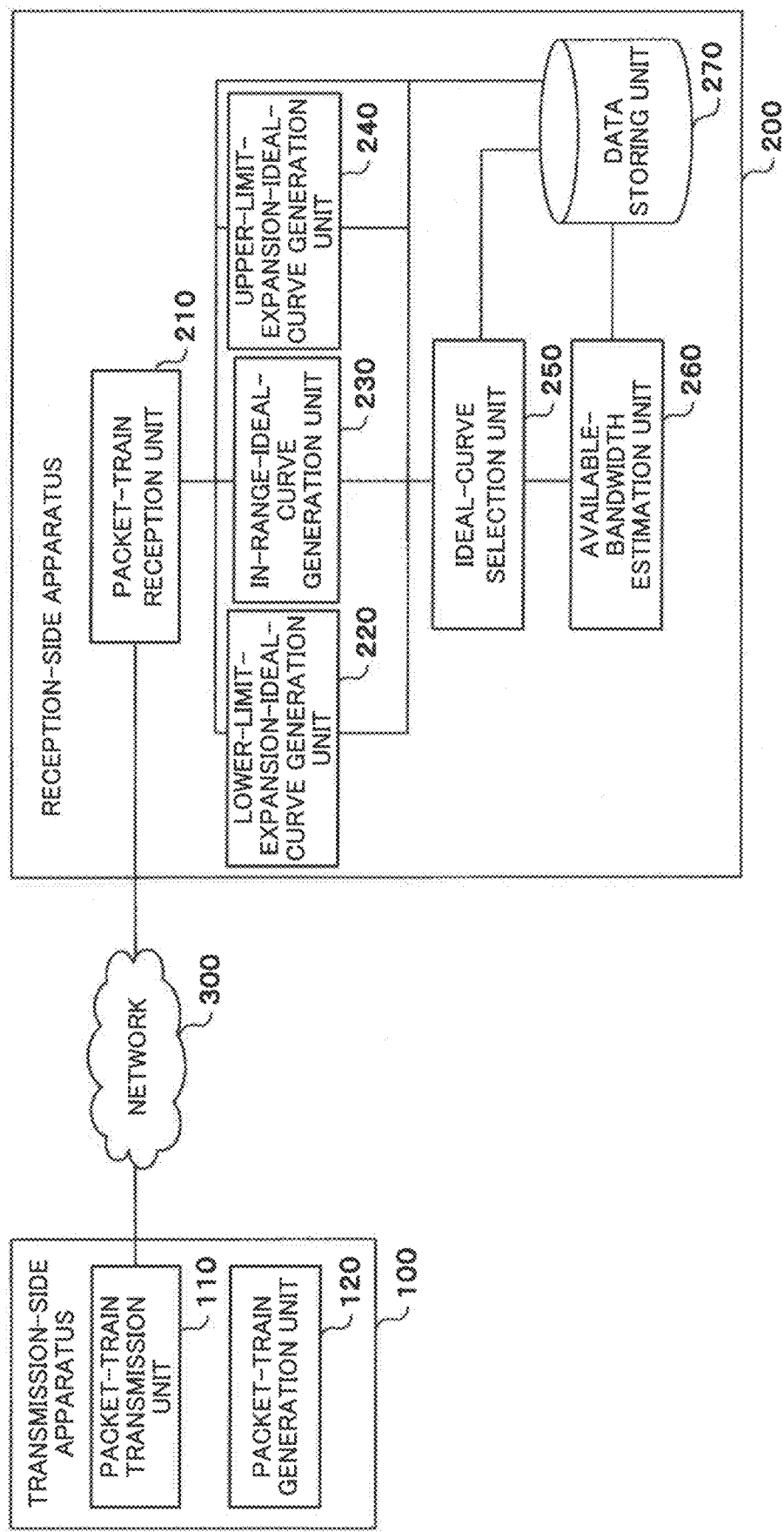
FIG. 2 is a configuration diagram illustrating a more detailed configuration example of the communication system in the first example embodiment.

FIG. 2 is a configuration diagram illustrating a more detailed configuration example of a communication system according to the present example embodiment. The transmission-side apparatus 100 and the reception-side apparatus 200 may have a configuration as illustrated in FIG. 2, for example.

Configuration of Transmission-Side Apparatus 100

In the example illustrated in FIG. 2, the transmission-side apparatus 100 includes a packet-train generation unit 120 and a packet-train transmission unit 110.

The packet-train generation unit 120 generates respective packets within a packet train for estimating an available bandwidth. More specifically, the packet-train generation unit 120 generates estimation packets in which a packet size gradually increases.

The packet-train transmission unit 110 transmits respective packets within a packet train for estimating an available bandwidth toward the reception-side apparatus 200. More specifically, the packet-train transmission unit 110 successively transmits estimation packets generated by the packet-train generation unit 120 toward the reception-side apparatus 200 at an equal distance (predetermined transmission interval).

Configuration of Reception-Side Apparatus 200

In the example illustrated in FIG. 2, the reception-side apparatus 200 includes a packet-train reception unit 210, a lower-limit-expansion-ideal-curve generation unit 220, an in-range-ideal-curve generation unit 230, an upper-limit-expansion-ideal-curve generation unit 240, an ideal-curve selection unit 250, an available-bandwidth estimation unit 260, and a data storing unit 270.

The packet-train reception unit 210 receives respective estimation packets included in a packet train transmitted from the transmission-side apparatus 100. Further, for respective estimation packets, the packet-train reception unit 210 calculates an increment of delay with respect to a delay of a head packet in one-way, based on a reception time of the respective estimation packets. In the following, the increment of delay with respect to a one-way delay of the head packet may be referred to as a "delay increase amount". By setting the one-way delay of the head packet as a reference, it is possible to express not only a queuing delay occurring in an estimation packet thereafter, but also an increment of serialization delay.

The lower-limit-expansion-ideal-curve generation unit 220 generates a lower-limit expansion ideal curve being an ideal curve when a true value falls below a lower limit of a search range, based on a queuing delay which is predicted to occur in an estimation packet, in order to expand the lower limit of the search range by a packet train.

The lower-limit-expansion-ideal-curve generation unit 220 may generate an ideal curve constituted of a queuing delay, as a lower-limit expansion ideal curve, for example. The lower-limit-expansion-ideal-curve generation unit 220 may generate an ideal curve expressing an increase tendency of a queuing delay occurring in respective estimation packets within a packet train to be actually transmitted, when it is assumed that a packet whose packet number is zero or a minus number is virtually transmitted, and assumed that a queuing delay starts to occur in an estimation packet after one of the packets. Note that, in an ideal curve, a queuing delay occurring in respective estimation packets is expressed as an increment with respect to a one-way delay of a head packet (specifically, a delay increase amount). A similar idea is applied to the other ideal curves.

The in-range-ideal-curve generation unit 230 generates an in-range ideal curve being an ideal curve when a true value falls within a search range by a packet train, based on a serialization delay and a queuing delay which are predicted to occur in an estimation packet.

The in-range-ideal-curve generation unit 230 may generate an ideal curve constituted of a serialization delay and a queuing delay, as an in-range ideal curve, for example. The in-range-ideal-curve generation unit 230 may generate an ideal curve expressing an increase tendency of a serialization delay and queuing delay occurring in respective estimation packets, when a queuing delay starts to occur in an estimation packet after one of packets within a packet train from a head packet to a tail packet.

The upper-limit-expansion-ideal-curve generation unit 240 generates an upper-limit expansion ideal curve being an ideal curve when a true value falls above an upper limit of a search range, based on a serialization delay which is predicted to occur in an estimation packet, in order to expand the upper limit of the search range by a packet train.

The upper-limit-expansion-ideal-curve generation unit 240 may generate an ideal curve constituted of a serialization delay, as an upper-limit expansion ideal curve, for example. The upper-limit-expansion-ideal-curve generation unit 240 may generate an upper-limit expansion ideal curve expressing an increase tendency of a serialization delay occurring in respective estimation packets within an actual packet train, when it is assumed that an estimation packet is virtually transmitted even after a tail packet, and a queuing delay starts to occur in an estimation packet after one of the estimation packets.

The ideal-curve selection unit 250 compares an increase tendency of a delay increase amount acquired from a reception time of respective estimation packets of a packet train indicated by observation data, with each of a lower-limit expansion ideal curve, an in-range ideal curve, and an upper-limit expansion ideal curve; and selects a most similar ideal curve to the increase tendency. Hereinafter, an ideal curve selected by the ideal-curve selection unit 250 may be referred to as a selected ideal curve. The ideal-curve selection unit 250 may calculate a sum of squared errors between a delay increase amount of respective estimation packets to be acquired from a reception time of respective estimation packets included in a packet train indicated by observation data, and a delay increase amount of respective estimation packets indicated by an ideal curve as a comparison target; and select an ideal curve in which an error becomes smallest.

The available-bandwidth estimation unit 260 calculates an estimated value of an available bandwidth, based on information on a location (hereinafter, referred to as a delay occurrence location) where it is assumed that a queuing delay starts to occur in the selected ideal curve. The available-bandwidth estimation unit 260 calculates a transmission rate associated with a packet number at which it is assumed that a queuing delay starts to occur after the packet in the selected ideal curve, as an estimated value of an available bandwidth, for example.

Description on Data Structure

Figure 3:
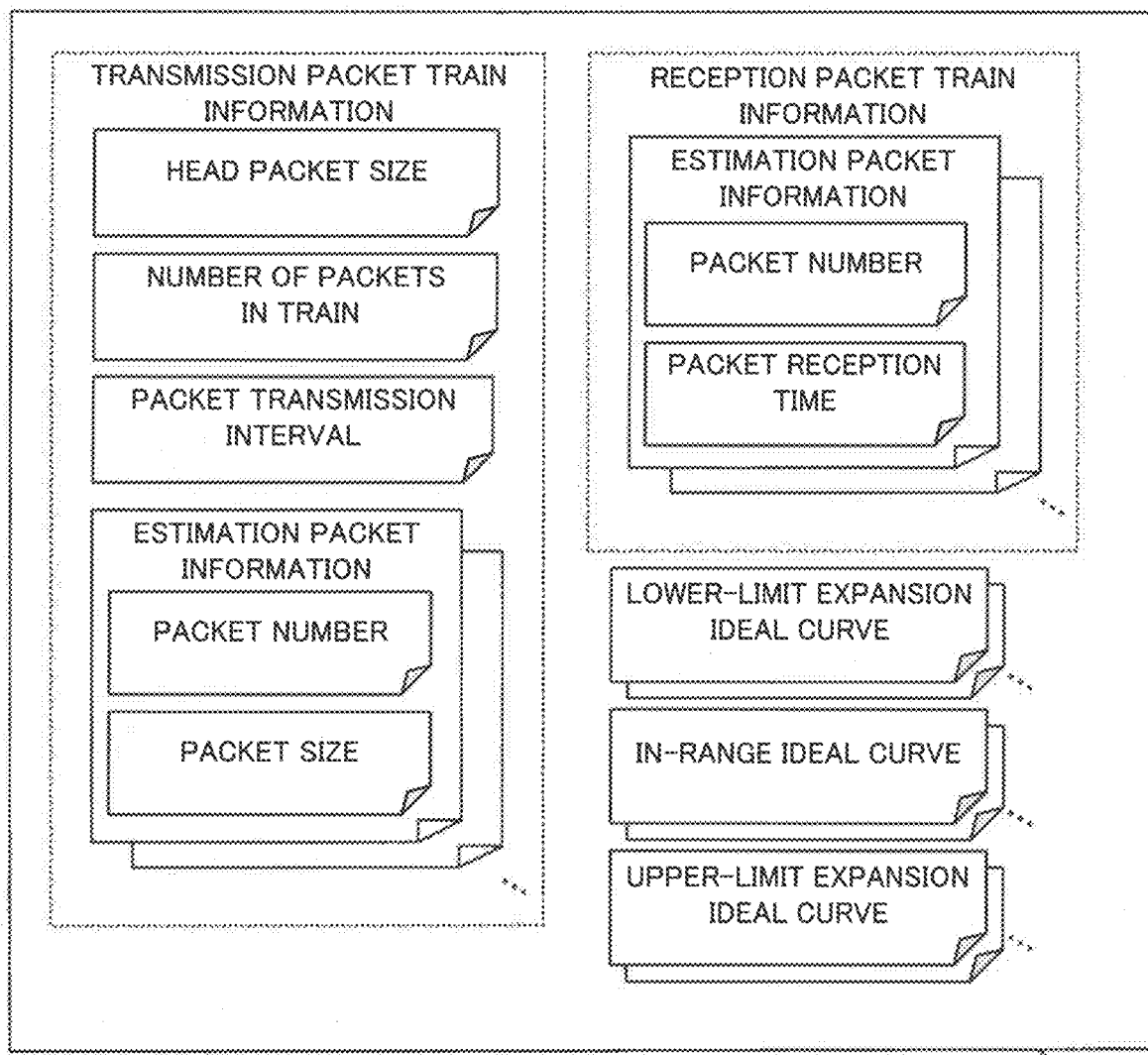
FIG. 3 is an explanatory diagram illustrating an example of a data structure in the first example embodiment.

Further, FIG. 3 is an explanatory diagram illustrating an example of a data structure in the present example embodiment. Note that the data structure illustrated in FIG. 3 depicts an example of a data structure of data to be stored in the data storing unit 270 in the reception-side apparatus 200. As illustrated in FIG. 3, the data storing unit 270 may include an area for storing transmission-packet-train information, reception-packet-train information, lower-limit expansion ideal curves, in-range ideal curves, and upper-limit expansion ideal curves. Transmission-packet-train information in the present example embodiment includes a head packet size, an in-train packet number, and a packet transmission interval. The transmission-packet-train information further includes estimation packet information having a packet number and a packet size regarding respective estimation packets within a packet train. Further, reception-packet-train information in the present example embodiment includes estimation packet information having a packet number and a packet reception time regarding respective estimation packets within a packet train.

Note that respective estimation packets of a packet train may include information corresponding to transmission-packet-train information, in place of storing transmission-packet-train information in the data storing unit 270. For example, the transmission-side apparatus 100 may include, in respective estimation packets of a packet train, a head packet size, a number of packet in a train, and a packet transmission interval, in addition to a packet number and a packet size.

Herein, a packet number is information for identifying an estimation packet within a packet train. A head packet size is a packet size of a head packet of a packet train. A packet size is a packet size of an estimation packet indicated by a packet number within a packet train. A number of packet in a train is a total number of estimation packets composing a packet train. A packet transmission interval is a transmission interval of respective estimation packets composing a packet train. Note that, in the present example embodiment, a packet transmission interval is constant regarding respective estimation packets within a packet train. A packet reception time is a point of time when an estimation packet indicated by a packet number within a packet train is received. Note that the data storing unit 270 may store a reception interval of an estimation packet after a second estimation packet, in place of storing a reception time of respective estimation packets.

Further, respective ideal curves include not only information indicating an ideal curve itself (e.g. a delay increase amount of respective estimation packets composing the ideal curve), but also information on a delay occurrence location (e.g. a packet number) in the ideal curve.

Description on Operation

Figure 4:
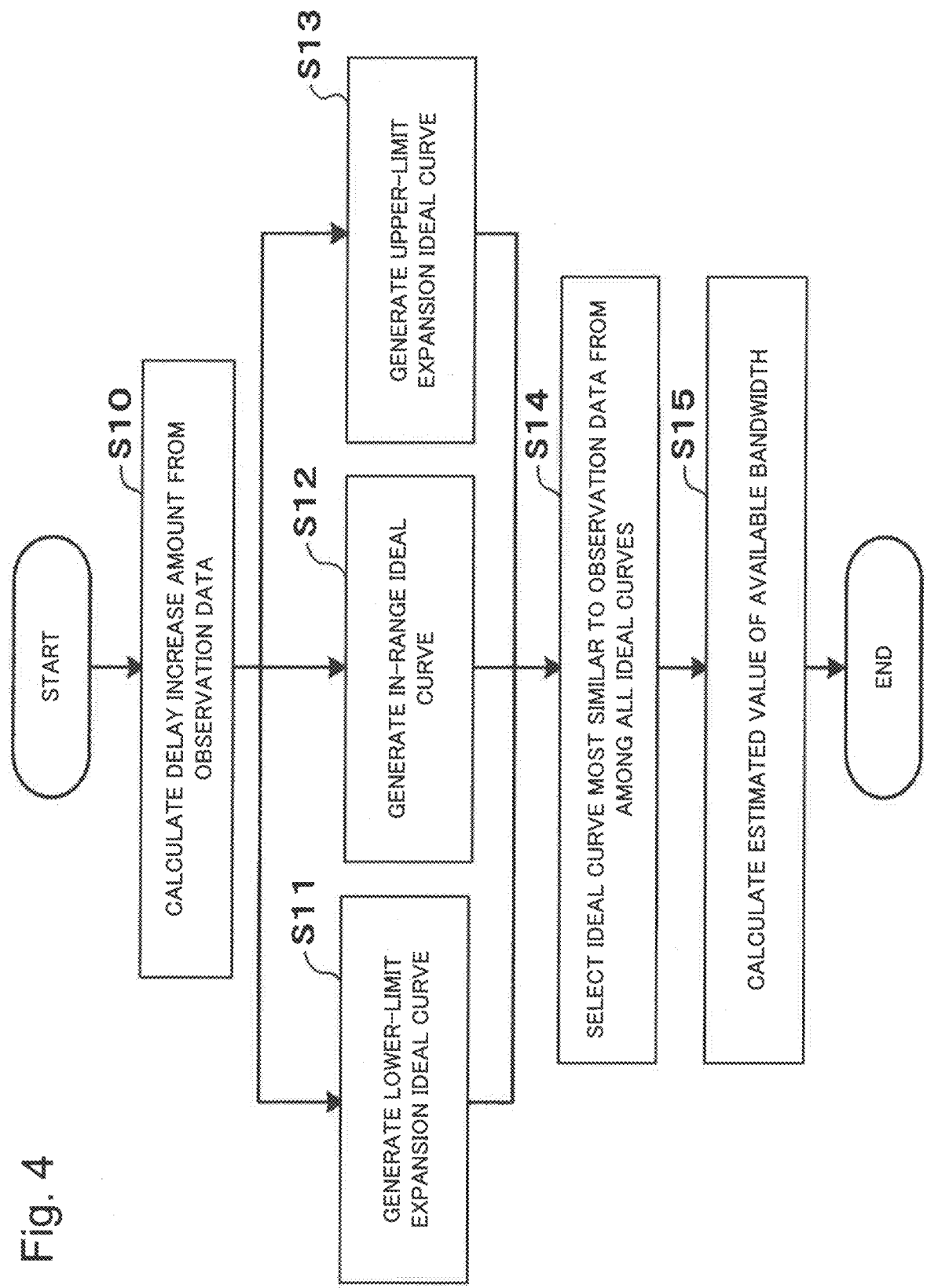
FIG. 4 is a flowchart illustrating an example of an operation of a reception-side apparatus 200 in the first example embodiment.

Next, an operation of the present example embodiment is described. FIG. 4 is a flowchart illustrating an example of an operation of the reception-side apparatus 200 in the present example embodiment.

First of all, in the example illustrated in FIG. 4, the packet-train reception unit 210 of the reception-side apparatus 200 calculates a delay increase amount with respect to respective estimation packets received from the transmission-side apparatus (Step S10).

The packet-train reception unit 210 may calculate a delay increase amount D(i) based on actual measurement data by using the following Equation (2), for example. Herein, S(i) indicates a point of time when an i-th estimation packet within a packet train is transmitted from the transmission-side apparatus 100. Further, R(i) indicates a point of time when the i-th estimation packet within the packet train arrives at the reception-side apparatus 200.

$$D(i)=\{R(i)-R(1)\}-\{S(i)-S(1)\} \quad \text{Equation (2)}$$

where i=2, 3, . . . , and N.

Note that D(1)=0 from a definition on a delay increase amount.

Subsequently, the lower-limit-expansion-ideal-curve generation unit 220 generates a lower-limit expansion ideal curve (Step S11). Further, the in-range-ideal-curve generation unit 230 generates an in-range ideal curve (Step S12). Further, the upper-limit-expansion-ideal-curve generation unit 240 generates an upper-limit expansion generation curve (Step S13). Note that it is assumed that the order of operations of Step S11 to Step S13 does not matter. Further, when transmission-packet-train information is known in advance, operations of Step S11 to Step S13 may be performed in advance, or by another apparatus and the like, and a result of the operations (ideal curve group) may be stored. Note that a method for generating a lower-limit expansion ideal curve, an in-range ideal curve, and an upper-limit expansion ideal curve will be described later.

Subsequently, the ideal-curve selection unit 250 compares an increase tendency of a delay increase amount of respective estimation packets calculated from observation data (estimated point of time when an estimation packet is actually received), with a lower-limit expansion ideal curve, an in-range ideal curve and an upper-limit expansion ideal curve; and selects a most similar ideal curve to the increase tendency (Step S14).

Subsequently, the available-bandwidth estimation unit 260 calculates an estimated value of an available bandwidth, based on information on a delay occurrence location of the selected ideal curve (selected ideal curve) (Step S15). The available-bandwidth estimation unit 260 may derive a value acquired by dividing a transmission rate of a packet specified as a delay occurrence location in the selected ideal curve (including a virtual packet that is not actually transmitted), and being a packet size of the packet, by a packet transmission interval, as an estimated value of an available bandwidth.

Note that, in a case of an in-range ideal curve, one of estimation packets including a first packet being a head packet and an N-th packet being a tail packet is specified as a delay occurrence location. Further, in a case of a lower-limit expansion ideal curve, a virtual estimation packet whose packet number is zero or a minus number is specified as a delay occurrence location. Further, in a case of an upper-limit expansion ideal curve, a virtual estimation packet whose packet number is larger than N being the packet number of a tail packet is specified as a delay occurrence location.

As described above, it is possible to calculate an estimated value of an available bandwidth with respect to a range wider than a search range by a packet train.

Generation Method of Ideal Curve

Next, a generation method of an ideal curve is described. In the following, a variable k indicating a packet number (including a virtual packet number) within a packet train when a queuing delay occurs is introduced. Further, a variable i indicating any packet number (including a virtual packet number) within a packet train is introduced.

Generation Method of In-Range Ideal Curve

Figure 5:
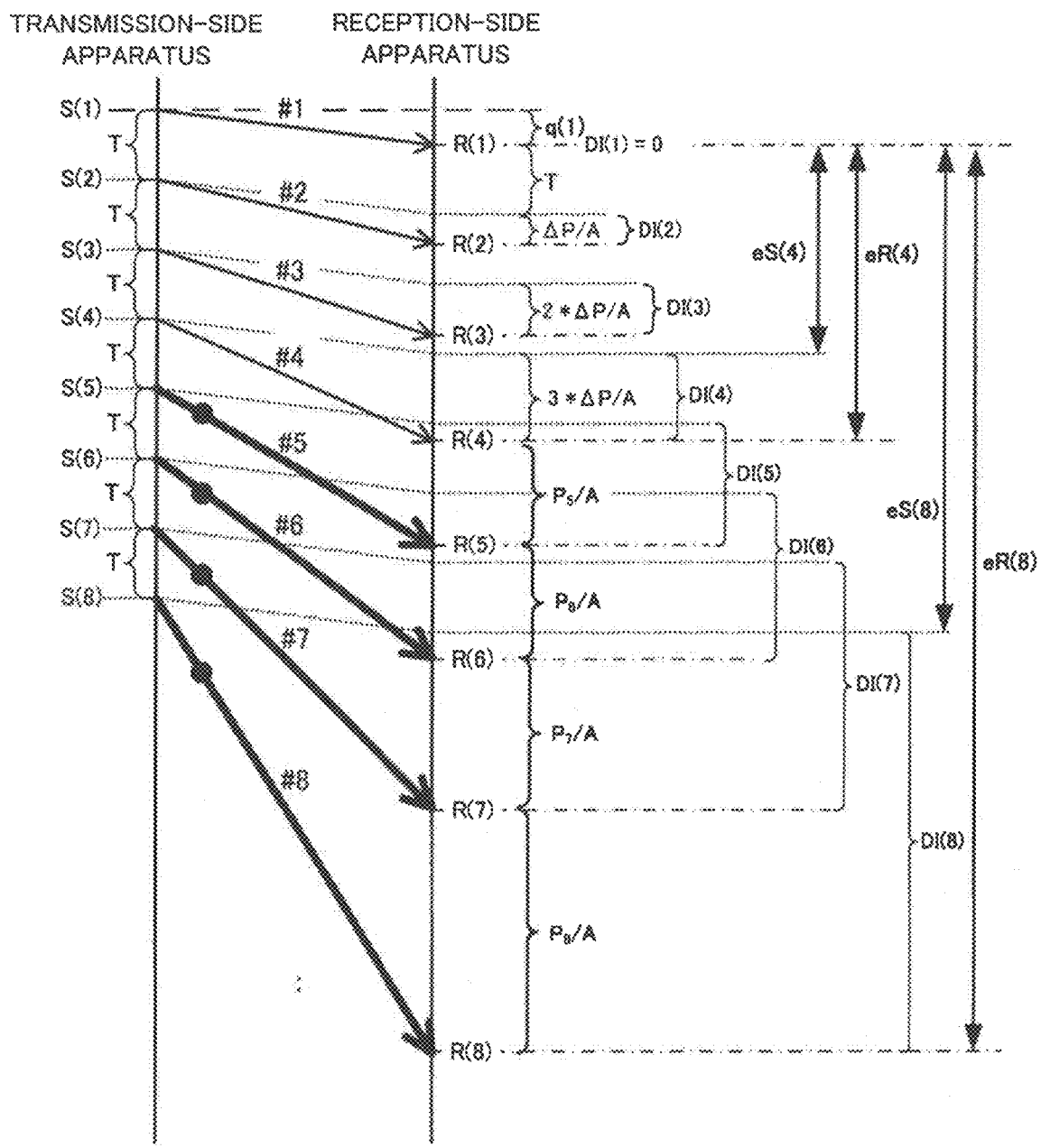
FIG. 5 is an explanatory diagram illustrating a delay increase amount of respective estimation packets in an ideal curve, when a true value falls within a range.

First of all, a generation method of an in-range ideal curve is described. FIG. 5 is an explanatory diagram illustrating a delay increase amount of respective estimation packets in an ideal curve, when a true value falls within a range. FIG. 5 is an explanatory diagram illustrating a delay increase amount of respective estimation packets, when it is assumed that a queuing delay starts to occur in an estimation packet where k=4, specifically in a fourth estimation packet. In FIG. 5, DI(i) indicates an ideal delay increase amount of an i-th estimation packet. Further, T indicates a transmission interval [sec]. Further, ΔP indicates an increment [bit] of packet size, when a packet number increases by one. Further, A indicates a true value [bps] of an available bandwidth. Further, $P_i$ indicates a packet size [bit] of the i-th packet. Further, S(i) and R(i) indicate a transmission time [sec] and a reception time [sec] of an estimation packet.

From a definition, the ideal delay increase amount DI(i) of respective estimation packets may be acquired by setting q(1)=R(1)−S(1), which is included in q(i)={R(i)−R(1)}−{S(i)−S(1)} as an increment of a delay amount q(i) included in the i-th packet to a one-way delay q(1) of a head packet, to zero. Note that the reason of q(1)=DI(i)=0 is based on the definition on a "delay increase amount".

As illustrated in FIG. 5, estimation packets whose packet numbers are 1 to 4 are not affected by a queuing delay of a preceding packet. Therefore, in the present example, it is assumed that estimation packets whose packet numbers are 1 to 4 are affected only by a serialization delay. Thus, an ideal delay increase amount DI(i) of estimation packets whose packet numbers are 1 to 4 is acquired by setting q(1)=0 in q(i), and setting R(i)=R(i−1)+T+ΔP/A. This is because a reception time R(i) of an estimation packet includes not only a transmission interval from a reception time of a preceding packet but also a serialization delay depending on an increment of packet size.

Specifically, an ideal delay increase amount DI(i) of first to fourth estimation packets is expressed as follows.

$$DI(1) = R(1) - S(1) = 0$$

$$DI(2) = \{R(2) - R(1)\} - \{S(2) - S(1)\} = R(2) - S(2) =$$
$$\{R(1) + T + \Delta P/A\} - \{S(1) + T\} = \{R(1) - S(1)\} + \Delta P/A = \Delta P/A$$

$$DI(3) = \{R(3) - R(1)\} - \{S(3) - S(1)\} =$$
$$R(3) - S(3) = \{R(2) + T + \Delta P/A\} - \{S(2) + T\} =$$
$$\{(R(1) + T + \Delta P/A) + T + \Delta P/A\} - \{(S(1) + T) + T\} =$$
$$\{R(1) - S(1)\} + (2 * \Delta P)/A = (2 * \Delta P)/A$$

$$DI(4) = \{R(4) - R(1)\} - \{S(4) - S(1)\} =$$
$$R(4) - S(4) = \{R(3) + T + \Delta P/A\} - \{S(3) + T\} =$$
$$\{R(1) - S(1)\} + (3 * \Delta P)/A = (3 * \Delta P)/A$$

On the other hand, as illustrated in FIG. 5, estimation packets whose packet numbers are 5 and thereafter are affected by a queuing delay of a preceding packet. Therefore, in the present example, an ideal delay mount DI(i) of estimation packets whose packet numbers are 5 and thereafter is acquired by setting q(1)=0 in q(i), and setting R(i)=R(i−1)+$P_i$/A. This is because it is assumed that time required for transmitting data corresponding to a packet size is added at a reception time of a preceding packet at a reception time R(i) of an estimation packet. Note that there is no vacancy of a bandwidth occurring by a transmission interval, since a transmission rate of an estimation packet exceeds an available bandwidth.

Specifically, an ideal increase amount DI(i) of a fifth estimation packet and thereafter is expressed as follows.

$$DI(5) =$$
$$\{R(5) - R(1)\} - \{S(5) - S(1)\} = R(5) - S(5) = \{R(4) + P_5/A\} - \{S(4) + T\} =$$
$$DI(4) + \{P_5/A - T\} = (3^*\Delta P/A) + \{P_5/A - T\}$$

$$DI(6) = \{R(6) - R(1)\} - \{S(6) - S(1)\} = R(6) - S(6) =$$
$$DI(5) + \{P_6/A - T\} = (3*\Delta P/A) + \{(P_5 + P_6)/A\} - (2 * T)$$

$$DI(7) = \{R(7) - R(1)\} - \{S(7) - S(1)\} = R(7) - S(7) =$$
$$DI(6) + \{P_6/A - T\} = (3*\Delta P/A) + \{(P_5 + P_6 + P_7)/A\} - (3 * T)$$

$$DI(8) = \{R(8) - R(1)\} - \{S(8) - S(1)\} =$$
$$R(8) - S(8) = (3*\Delta P/A) + \{(P_5 + P_6 + P_7 + P_8)/A\} - (4 * T)$$

When these equations are generalized, and when a delay occurrence location is a k-th packet, these equations are expressed as follows:

when i=1, $$DI(i) = 0 \quad \quad \text{Equation (3)},$$

when 1<i≤k, $$DI(i) = (i-1)*\Delta P/A_k \quad \quad \text{Equation (4)},$$

when k<i≤N, $$DI(i) = (k-1)*\Delta P/A_k + \{(P_{k+1} + P_{k+2} + \ldots + P_i)/A_k\} - (i-k)*T \quad \text{Equation (5)}.$$

Note that $A_k$ indicates that a true value of an available bandwidth corresponds to a transmission rate of the k-th packet.

The in-range-ideal-curve generation unit 230 may calculate a delay increase amount DI(i) of respective estimation packets by increasing k from 1 to N one by one, and using the above-described Equations (3) to (5) for respective k, for example. In this case, for example, N in-range ideal curves are generated. Note that a set of delay increase amounts DI(i) of respective estimation packets acquired for one k becomes an in-range ideal curve when it is assumed that a queuing delay starts to occur in a packet associated with the k.

Note that a packet size of an estimation packet to be transmitted from the transmission-side apparatus 100 increases, as a packet number increases. Therefore, an increment of packet size from a head packet also increases, as the packet number increases. Thus, it is clear that DI(i) in the above-described Equation (4) indicates a linear functional increase tendency with respect to a packet number.

Further, Pi=$P_1$+ΔP*(i−1). Therefore, {$P_{k+1}$+$P_{k+2}$+ . . . +$P_i$} in the above-described Equation (5) is equal to a sum of an arithmetic progression of an initial term $P_{k+1}$ and a tolerance ΔP. Further, a first term on a right side in Equation (5) is a fixed value, and a third term on the right side is a monotonously increasing linear function. Thus, it is clear that DI(i) in Equation (5) exhibits a quadratic functional increase tendency with respect to a packet number.

In this way, theoretically, DI(i) is such that a delay increases linear functionally in a range: 1<i≤k, and a delay increases quadratic functionally in a range: k<i≤N.

Generation Method of Lower-Limit Expansion Ideal Curve

Next, a generation method of a lower-limit expansion ideal curve is described. Note that a transmission condition of a packet train is similar to the description on an in-range ideal curve.

In generation of a lower-limit expansion ideal curve, it is assumed that a transmission rate of an estimation packet whose packet number is k and belonging to a range exceeding a search lower limit, specifically, a range where k≤0 is a true value $A_k$ of an available bandwidth, and a delay increase amount DI(i) occurring in respective estimation packets is acquired. In this case, similarly to a case of an in-range ideal curve, it is assumed that a queuing delay affects a (k+1)-th estimation packet and thereafter. However, since packets whose packet numbers are zero and below zero are not actually transmitted, it is assumed that a packet size of a packet whose packet number is zero or a minus number and which affects a queuing delay is zero.

In summary, when k≤0, and
when i≤0,
DI(i)=0, note that an actual packet size=0
when i=1,
the aforementioned Equation (3)
when 1<i≤N, $$DI(i)=\{P_1+P_2+ \ldots +P_i\}/A_k-(i-1)*T \quad \text{Equation (6)}$$

Note that, since there is no observation data as a comparison target for DI(i) when i≤0, DI(i) of respective packets may be acquired in a range: 1≤i≤N.

Further, since $P_i=P_1+\Delta P*(i-1)$, $\{P_1+P_2+ \ldots P_i\}$ in the above-described Equation (6) is equal to a sum of an arithmetic progression of an initial term $P_1$ and a tolerance $\Delta P$. Therefore, it is clear that the above-described DI(i) indicates a quadratic functional increase tendency with respect to a packet number.

The lower-limit-expansion-ideal-curve generation unit 220 calculates a delay increase amount DI(i) of respective estimation packets by decreasing k from 0 to any minus number at which a virtual packet size does not become 0 one by one, and using the above-described Equation (6) for respective k, for example.

Generation Method of Upper-Limit Expansion Ideal Curve

Next, a generation method of an upper-limit expansion ideal curve is described. Note that a transmission condition of a packet train is similar to the description on an in-range ideal curve.

In generation of an upper-limit expansion ideal curve, it is assumed that a transmission rate of an estimation packet whose packet number is k and belonging to a range exceeding a search upper limit, specifically, a range where k>N is a true value $A_k$ of an available bandwidth, and a delay increase amount DI(i) occurring in respective estimation packets is acquired. In this case, a transmission rate of any of first to N-th estimation packets does not exceed an available bandwidth. Therefore, only a serialization delay occurs in the i-th estimation packet.

In summary, when k>N, and
when i=1, the above-described Equation (3), however, from a definition on a "delay increase amount",
when 1<i≤N,
the above-described Equation (4).

Note that, as already described, DI(i) in Equation (4) indicates a linear function with respect to a packet number. Therefore, an upper-limit expansion ideal curve is indicated only by a linear function.

The upper-limit-expansion-ideal-curve generation unit 240 calculates a delay increase amount DI(i) of respective estimation packets by decreasing k from N+1 to any number one by one, and using the above-described Equation (6) for respective k, for example. Note that, since there is no observation data as a comparison target for DI(i) when i>N, DI(i) of respective packets may be acquired in a range where 1≤i≤N.

As described above, according to the present example embodiment, it is possible to estimate an available bandwidth more accurately, simply by transmitting and receiving a packet train composed of a plurality of packets in which a transmission interval of respective packets is equal distant, and a packet size gradually increases. A reason for this is that it is possible to expand a search lower limit, since not only an ideal curve when a queuing delay occurs in a search range by a packet train, but also a virtual ideal curve are generated, based on a delay increase amount when a packet that is not actually transmitted and whose packet number is zero or a minus number is transmitted. Further, this is because it is possible to expand a search upper limit, since a virtual ideal curve is generated, based on a delay increase amount when a packet whose packet number exceeds a packet number of a tail packet is transmitted.

In the following, an operation of the above-described example embodiment is described by using concrete numerical values. Note that, in the following respective examples, a structure of a packet train to be transmitted from the transmission-side apparatus 100 is as follows. Specifically, a number of packets of a packet train is one hundred and fifty-one (N=151), a head packet size is 60 bytes (480 bits), a packet increment is 8 bytes, and a transmission interval is 0.0002 sec. Note that this leads to a packet size of a tail packet of a packet train being 1260 bytes (10080 bits), and a search range by a packet train being a range from 2.4 Mbps (lower limit) to 50.4 Mbps (upper limit) by a structure of the packet train.

Further, in the following respective examples, a case where an available bandwidth is estimated by using only an ideal curve generated without expanding a search range and with assuming that a true value of an available bandwidth falls within the search range is described as a comparative example. In an ideal curve of the comparative example, it is assumed that a delay amount of an i-th packet with respect to a reception time of a preceding packet is q'(i)=T (specifically, no substantial delay) before occurrence of a queuing delay, and q'(i)=$P_i/A_k$ after occurrence of a queuing delay; and a delay increase amount DI'(i) of respective estimation packets is acquired by setting a one-way delay amount q'(i) of a head packet included in Σq'(i)−q(1)−(i−1)*T to 0. Note that the reason of DI'(1)=q'(1)=0 is based on the definition on an "increase delay amount".

$$DI'(1)=P_1/A_k=0$$

when i≤k, $$DI'(2)=R(2)-R(1)-T=q(2)-T=0$$

when k<i, $$DI'(2) = R(2) - R(1) - T =$$
$$q(2) - T = \{P_1 + P_2\}/A_k - T = \{P_1 + P_1 + (i-1)*\Delta P\}/A_k - T =$$
$$2*P_1/A_k + \{(i-1)*\Delta P\}/A_k - T = 0 + \{(i-1)*\Delta P\}/A_k - T$$

when i≤k, $$DI'(3) = R(3) - R(1) - 2*T = q(2) + q(3) - 2*T = 0$$

when k<i, $$DI'(3) = R(3) - R(1) - 2*T = q(2) + q(3) - 2*T =$$
$$\{P_1 + P_2 + P_3\}/A_k - 2*T = \{3*P_1 + (i-1)*\Delta P\}/A_k - 2*T =$$
$$3*P_1/A_k + \{(i-1)*\Delta P\}/A_k - 2*T = 0 + \{(i-1)*\Delta P\}/A_k - 2*T$$

When these equations are generalized, in an ideal curve in the comparative example:
when i≤k, $$DI'(i)=0$$

when k<i, $$DI'(i)=\{(i-1)*\Delta P\}/A_k-(i-1)*T=DI(i)$$

where i≤k≤N.

Therefore, a search range of an ideal curve by the comparative example, which is generated based on the above-described configuration of a packet train, is a range from 2.4 Mbps (search lower limit) corresponding to a transmission rate of a head packet to 50.4 Mbps (search upper limit) corresponding to a transmission rate of a tail packet.

First Example

A first example is described with reference to FIG. 6 to FIG. 8. The present example is an example in which a true value of an available bandwidth falls below a search lower limit by a packet train.

Figure 6:
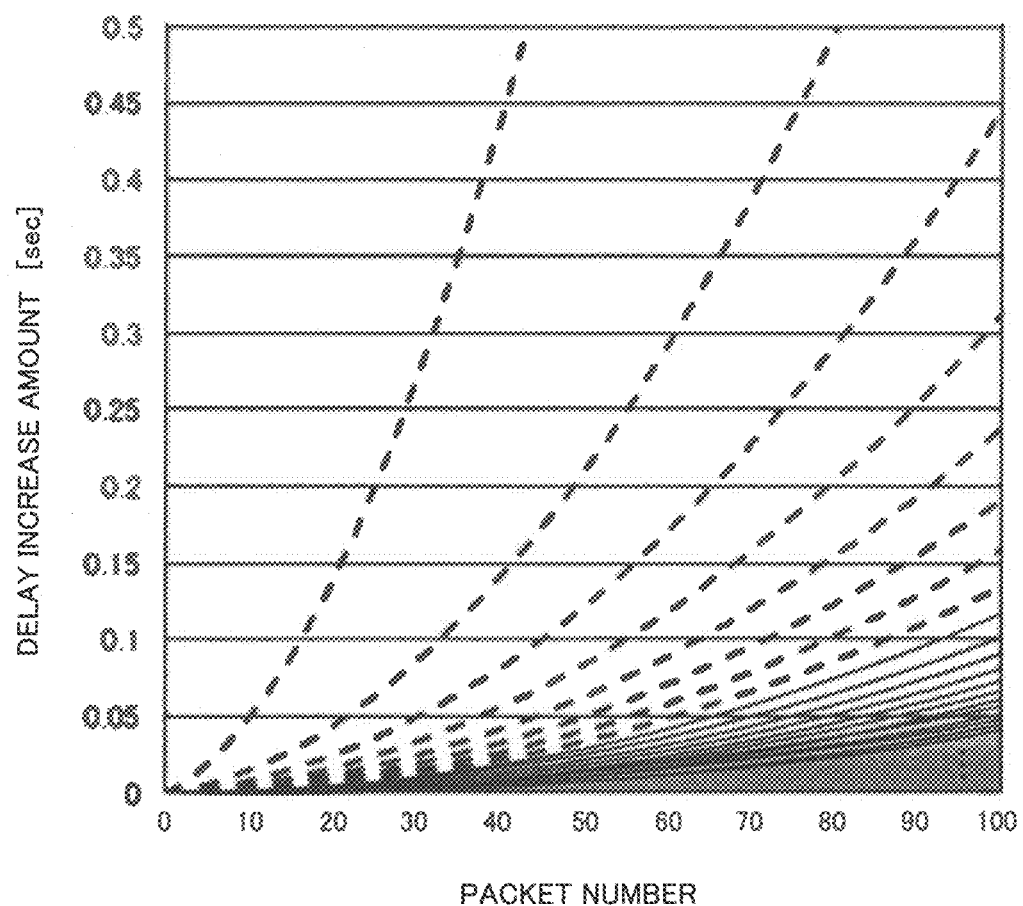
FIG. 6 is a graph illustrating an example of lower-limit expansion ideal curves in which a search lower limit is expanded, and in-range ideal curves.
Figure 7:
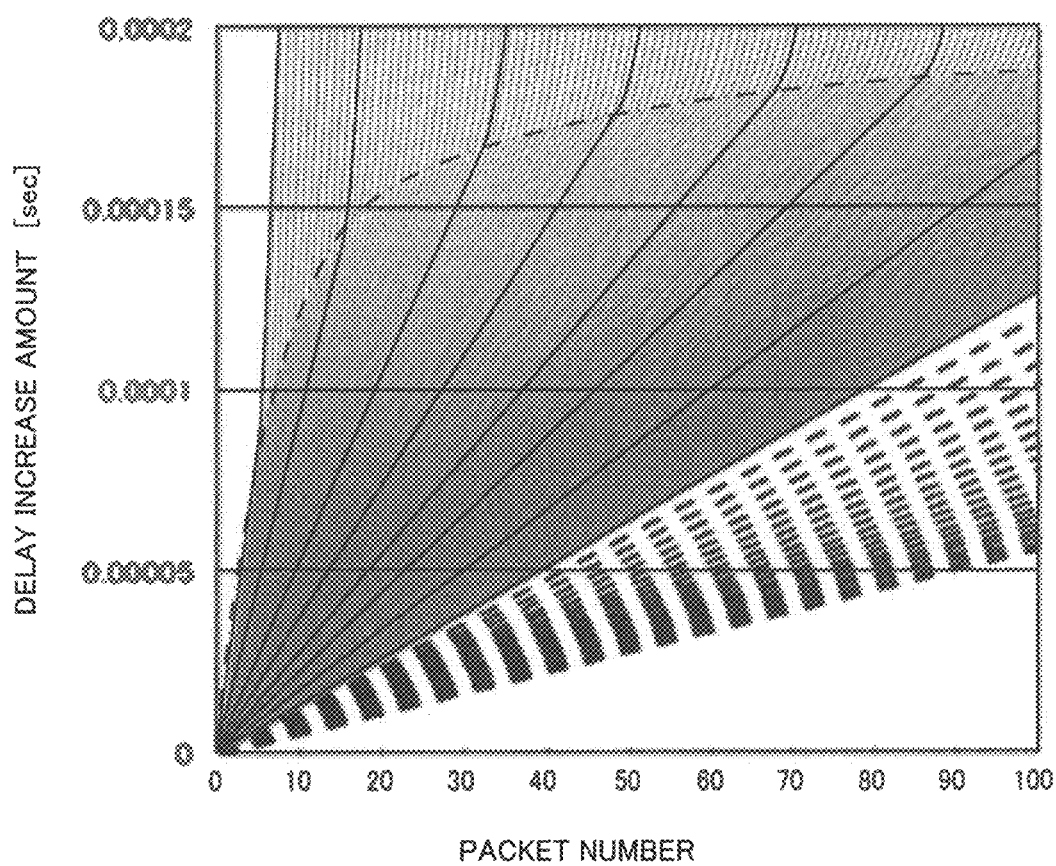
FIG. 7 is a graph illustrating an example of upper-limit expansion ideal curves in which a search upper limit is expanded, and in-range ideal curves.

FIG. 6 and FIG. 7 are graphs illustrating an example of an ideal curve in the present example embodiment generated based on the above-described structure of a packet train. Note that FIG. 6 is a graph illustrating an example of lower-limit expansion ideal curves in which a search lower limit is expanded, and in-range ideal curves. In FIG. 6, broken lines indicate an example of lower-limit expansion ideal curves, and solid lines indicate an example (partial excerpt) of in-range ideal curves. Further, FIG. 7 is a graph illustrating an example of upper-limit expansion ideal curves in which a search upper limit is expanded, and in-range ideal curves. In FIG. 7, broken lines indicate an example of upper-limit expansion ideal curves, and solid lines indicate an example (partial excerpt) of in-range ideal curves. Further, in FIG. 6 and FIG. 7, a horizontal axis indicates a packet number of respective packets within a packet train, and a vertical axis indicates a delay increase amount DI(i) [sec]. Further, in FIG. 7, an area within a one-dot chain line indicates an area where i≤k in an ideal curve, and an upper area than the one-dot chain line indicates an area where i>k in the ideal curve.

Figure 8:
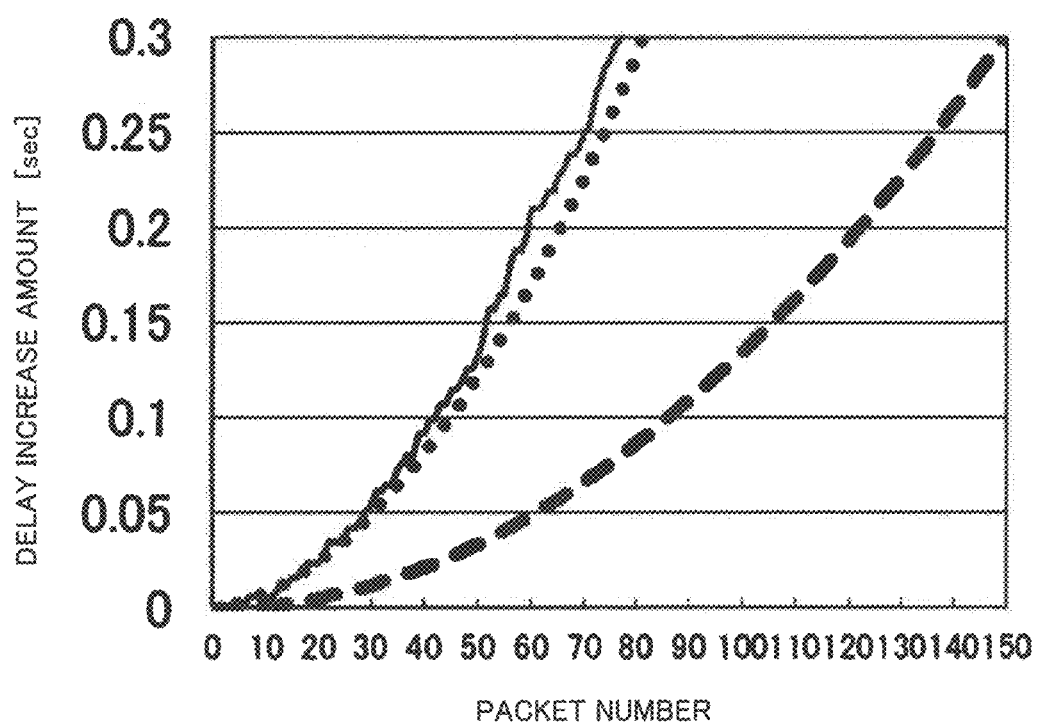
FIG. 8 is a graph illustrating an actually observed delay increase amount together with an ideal curve in a first example.

FIG. 8 is a graph illustrating an actually observed delay increase amount D(i) [sec] of respective estimation packets, when a true value $A_k$ of an available bandwidth is 1.12 Mbps, which is below a search lower limit, in comparison with a selected ideal curve of the present example and a selected ideal curve of a comparative example. In FIG. 8, a solid line indicates an actually observed delay increase amount D(i). Further, a dot line indicates an ideal curve most similar to the solid line among lower-limit expansion ideal curves generated by the present example. Further, a broken line indicates an ideal curve most similar to the solid line among ideal curves by the comparative example.

In the present example, in Step S10, (N−1) delay increase amounts D(i) are calculated where i=2, . . . , and N. Note that, in the present example, D(1) is fixed to zero. Herein, a graph acquired by plotting a calculated D(i) with respect to a packet number is the solid-line graph illustrated in FIG. 8.

Next, in Steps S11 to S13, three types of ideal curves are generated.

For example, in Step S12, a lower-limit expansion ideal curve in which a search lower limit is expanded is generated by assuming that a virtual packet is transmitted. For example, when it is assumed that a packet train is transmitted from a −7-th packet, a packet size of the −7-th packet serving as a virtual head packet becomes 4 bytes (=60 bytes−7-th*8 bytes), specifically, 32 bits. Therefore, when it is assumed that an available bandwidth is a transmission rate of the −7-th packet (32/0.0002=0.16 Mbps), it is possible to generate a lower-limit expansion ideal curve associated with k=−7 by acquiring DI(i) with use of the above-described Equation (6) where i=2, . . . , and N. In this way, it is possible to add eight lower-limit expansion ideal curves as illustrated by the broken lines in FIG. 6. Note that details of the eight ideal curves are ideal curves when it is assumed that a queuing delay starts to occur respectively in the −7-th packet to the 0-th packet. At this occasion, a search lower limit is expanded to 0.16 Mbps.

Further, for example, in Step S13, an upper-limit expansion ideal curve in which a search upper limit is expanded is generated by assuming that a virtual packet is transmitted. For example, an ideal curve is assumed in which a true value of an available bandwidth is 98.4 Mbps, which is a value above a search upper limit by a packet train (packet size=2460 bytes). In this case, since only a serialization delay affects in respective estimation packets, DI(i) being a delay increase amount of a head packet is calculated by using the above-described Equation (4) where i=2, . . . , and N. Note that DI(1) is fixed to zero. For example, DI(2) is calculated by dividing an increment ΔP=68−60=8 bytes (64 bits) of a packet size of a second estimation packet, by $A_k$=98.4 Mbps. Regarding a third estimation packet, a delay increase amount DI(2) is calculated by dividing 2*ΔP=16 bytes (specifically, 544 bits), by 98.4 Mbps. By calculating for packets thereafter in a similar manner, it is possible to acquire an upper-limit expansion ideal curve in which $A_k$=98.4 Mbps. The broken lines in FIG. 7 are an example of upper-limit expansion ideal curves acquired by setting $A_k$ outside a search range as described above.

Note that, in place of the above-described calculation example, DI(2) may be derived, for example, by acquiring a serialization delay of a first estimation packet by $P_1/A_k$, acquiring a serialization delay of a second estimation packet by $P_2/A_k$, and subtracting the serialization delay of the first estimation packet from the serialization delay of the second estimation packet. Similarly, for a third estimation packet and thereafter, DI(i) may be acquired by subtracting a serialization delay of a (i−1)-th estimation packet from a serialization delay of an i-th estimation packet. Further, a serialization delay (ΔP/$A_k$) with respect to an increment of packet may be acquired, and the serialization delays may be successively summed. A specific calculation method does not matter.

By performing the above-described processing, it is possible to set a search range in the first example from 0.16 Mbps to 146.7 Mbps, for example.

Note that an in-range ideal curve may be acquired by setting DI(i) with use of the above-described Equation (4) or Equation (5) for respective k, while changing a location of k from 1, . . . , to N where i=2, . . . , and N.

Note that, in the present example, DI(1) is fixed to zero in all ideal curves.

In Step S14, in order to select an ideal curve indicating an increase tendency of DI(i), which is most similar to an increase tendency of D(i) indicated by observation data, a sum of squared errors is calculated. Herein, a residual error of a delay increase amount in respective estimation packets may be set to D(i)−DI(i) by using DI(i) in respective ideal curves as a comparison target, and $\Sigma\{D(i)-DI(i)\}^2$, which is a sum of squared residual errors, may be set as a sum of squared errors in the ideal curve. The sum of squared errors may be acquired by changing a value of k, specifically, changing an ideal curve as a comparison target, and consequently, an ideal curve in which the sum of squared errors is smallest may be selected as an ideal curve most similar to observation data.

Herein, a selected ideal curve (broken line) by the comparative example in FIG. 8 is an ideal curve rising at a head packet, specifically, an ideal curve when k=1. Therefore, in the comparative example, as an estimated value of an available bandwidth, a value acquired by dividing 60 bytes (specifically, 480 bits) being a packet size of a first packet (head packet), by a transmission interval T=0.0002 sec, i.e., 2.4 Mbps is derived.

On the other hand, a selected ideal curve (dot line) of the present example in FIG. 8 is an ideal curve in which it is assumed that a queuing delay starts to occur from a −4-th estimation packet among generated lower-limited expansion ideal curves. Therefore, in the first example, as an estimated value of an available bandwidth, a value acquired by dividing 20 bytes (specifically, 160 bits) being a virtual packet size of the −4-th packet, by a transmission interval T=0.0002 sec, i.e., 0.8 Mbps is derived.

When the two examples are compared, it is clear that, in the first example, a value closer to $A_k$=1.12 Mbps being a true value of an available bandwidth when observation data is acquired is calculated as an estimated value of an available bandwidth, as compared with the comparative example.

In this way, by expanding a search lower limit with use of a "virtual ideal curve", it is possible to accurately estimate an available bandwidth.

Second Example

Next, a second example is described with reference to FIG. 6, FIG. 7, and FIG. 9. The present example is an example in which a true value of an available bandwidth falls above a search upper limit by a packet train.

Figure 9:
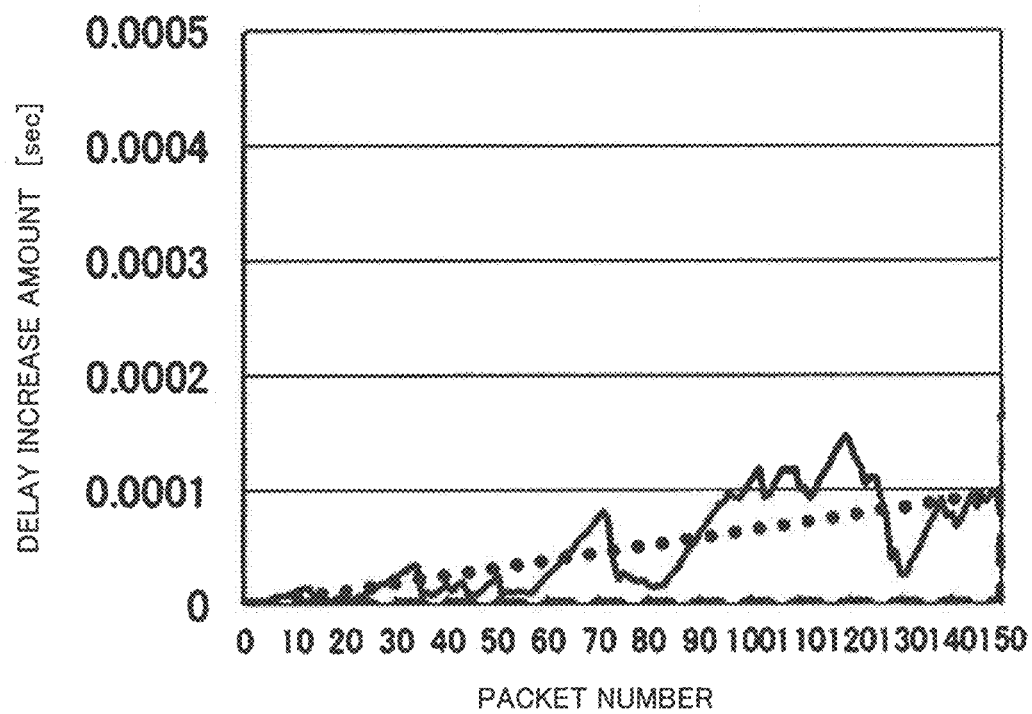
FIG. 9 is a graph illustrating an actually observed delay increase amount together with an ideal curve in a second example.

FIG. 9 is a graph illustrating an actually observed delay increase amount D(i) [sec] of respective estimation packets, when a true value $A_k$ of an available bandwidth is 57 Mbps, which is above a search upper limit by a packet train, in comparison with a selected ideal curve of the present example and a selected ideal curve of a comparative example. In FIG. 9, a solid line indicates an actually observed delay increase amount D(i). Further, a dot line indicates an ideal curve most similar to the solid line among upper-limit expansion ideal curves generated in the present example. Further, a broken line indicates an ideal curve most similar to the solid line among ideal curves by the comparative example.

A structure of a packet train in the present example is similar to the first example. Therefore, also in the present example, an ideal curve in which a search range is expanded is generated similarly to the first example.

Herein, a selected ideal curve (broken line) by the comparative example in FIG. 9 is an ideal curve rising at a tail packet, specifically, an ideal curve when k=N=151. Therefore, in the comparative example, as an estimated value of an available bandwidth, a value acquired by dividing 1260 bytes (specifically, 10080 bits) being a packet size of a 151-st packet (tail packet), by a transmission interval T=0.0002 sec, i.e., 50.4 Mbps is derived.

On the other hand, a selected ideal curve (dot line) of the present example in FIG. 9 is an ideal curve when it is assumed that a queuing delay starts to occur from a 168-th estimation packet among generated upper-limit expansion ideal curves.

Therefore, in the second example, as an estimated value of an available bandwidth, a value acquired by dividing 1396 bytes (specifically, 11168 bits) being a virtual packet size of the 168-th packet, by a transmission interval 0.0002 sec, i.e., 55.8 Mbps is derived.

When the two examples are compared, it is clear that, in the second example, a value closer to $A_k$=57 Mbps being a true value of an available bandwidth when observation data is acquired is calculated, as compared with the comparative example.

In this way, by expanding a search upper limit with use of a "virtual ideal curve", it is possible to accurately estimate an available bandwidth.

Third Example

Next, a third example is described with reference to FIG. 8, FIG. 9, and FIG. 10. The present example is an example in which a true value of an available bandwidth falls within a search range, but is not associated with a transmission rate of an estimation packet.

Also in this case, it is possible to enhance estimation accuracy by using an analytical solution.

Figure 10:
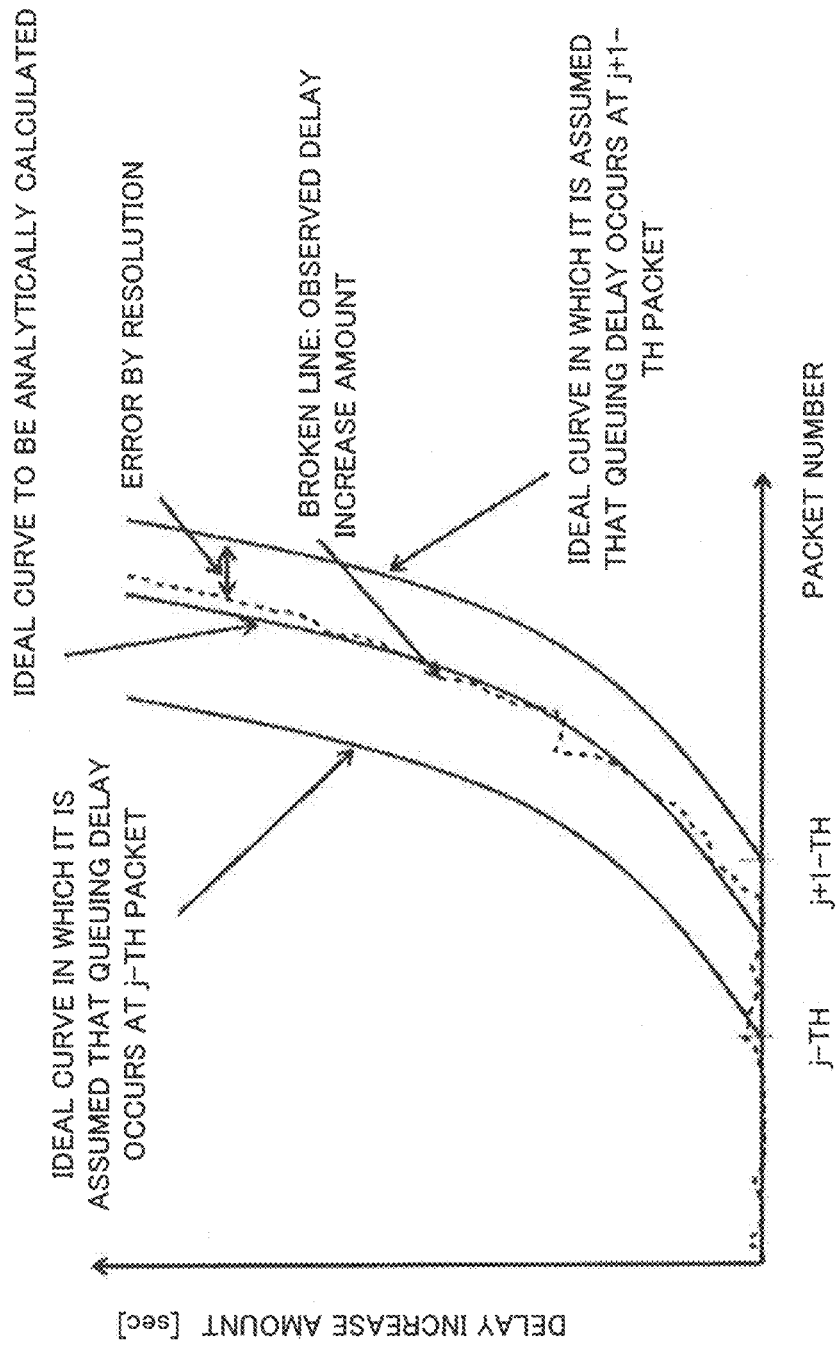
FIG. 10 is a graph illustrating an actually observed delay increase amount together with ideal curves in a third example.

First of all, FIG. 10 is a graph illustrating a delay increase amount D(i) by observation data, when a true value of an available bandwidth falls within a search range, but is not associated with a transmission rate of an estimation packet, in comparison with an in-line ideal curve of the present example. When a method in which an ideal curve most similar to observation data is selected, and a value associated with a delay occurrence location in the ideal curve is set as an estimated value of an available bandwidth is employed, the estimation value of the available bandwidth becomes a discrete value, since the estimation value is limited to a transmission rate of respective estimation packets. Therefore, there is a possibility that an error by resolution may occur. For example, when a delay increase amount D(i) as illustrated by a broken line in FIG. 10 is observed, although, a queuing delay actually starts to occur between a j-th packet and a j+1-th packet, a location where a queuing delay starts to occur in an ideal curve is limited to a discrete value i.e. a packet number. Therefore, an error by resolution occurs between observation data and an ideal curve. At this occasion, when it is assumed that an analytical solution is derived, an "ideal curve to be analytically calculated" in FIG. 10 is acquired as an ideal curve most similar to observation data, and an error by resolution is eliminated.

Therefore, it is possible to further enhance estimation accuracy by analytically calculating an ideal curve.

Next, deriving an analytical solution with respect to a part of an available bandwidth in the above-described example embodiment is described.

First of all, a case where a true value of an available bandwidth falls below a search lower limit is paid attention to. Herein, as illustrated by the solid line in FIG. 8, it is clear that an actual delay increase amount D(i) when a true value of an available bandwidth falls below a search lower limit is in conformity with DI(i) in Equation (6). This means that a delay increase amount D(i) indicated by observation data is a queuing delay resulting from a true value of an available bandwidth being lower than a search lower limit by a packet train.

Therefore, a selected ideal curve at this occasion is one of lower-limit expansion ideal curves and, as expressed by the above-described Equation (6), is expressed only by a quadratic function with respect to a packet number. Thus, it is possible to analytically calculate a configuration of a quadratic function in the reception-side apparatus 200 by performing quadratic regression using a least squares method and the like with respect to observation data. Further, the reception-side apparatus 200 (available-bandwidth estimation unit 260) is able to calculate an available bandwidth by comparing an analytically calculated quadratic function and a coefficient in the above-described Equation (6).

Next, a case where a true value of an available bandwidth falls above a search upper limit is paid attention to. Herein, as illustrated by the solid line in FIG. 9, it is clear that an actual delay increase amount D(i) when a true value of an available bandwidth falls above a search upper limit is in conformity with DI(i) in the above-described Equation (4). This means that only a serialization delay affects a delay increase amount D(i) indicated by observation data because a true value of an available bandwidth is higher than a search upper limit by a packet train.

Therefore, a selected ideal curve at this occasion is one of upper-limit expansion ideal curves and, as expressed by the above-described Equation (4), is expressed only by a linear function with respect to a packet number. Thus, it is possible to analytically calculate a configuration of a linear function in the reception-side apparatus 200 by performing linear regression using a least squares method and the like with respect to observation data. Further, the reception-side apparatus 200 (available-bandwidth estimation unit 260) is able to calculate an available bandwidth by comparing an analytically calculated linear function and a coefficient in the above-described Equation (4).

In this way, when a selected ideal curve is an upper-limit expansion ideal curve or a lower-limit expansion ideal curve, the reception-side apparatus 200 may further analyze observation data, and analytically fit an acquired D(i) to a configuration expressed by Equation (6) or Equation (4). Further, the reception-side apparatus 200 may set $A_k$ acquired as the analysis result, as an estimated value of an available bandwidth. For example, when an ideal curve with k=0 is generated as an upper-limit expansion ideal curve, an ideal curve with k=N+1 is generated as a lower-limit expansion ideal curve, and one of the above-described ideal curves is selected as a most similar ideal curve, an estimation value of an available bandwidth may be acquired by an analytical method.

Note that, in the above-described example embodiment, respective ideal curves are generated as an ideal curve expressing a delay increase amount with respect to a packet number. However, a delay amount expressed by an ideal curve may not necessarily be a "delay increase amount".

A delay amount expressed by an ideal curve may be an amount including not only an increase tendency of a queuing delay of respective estimation packets depending on an available bandwidth, but also an increase tendency of a serialization delay of respective estimation packets depending on an available bandwidth; and for example, may include a one-way delay of a head packet.

Figure 11:
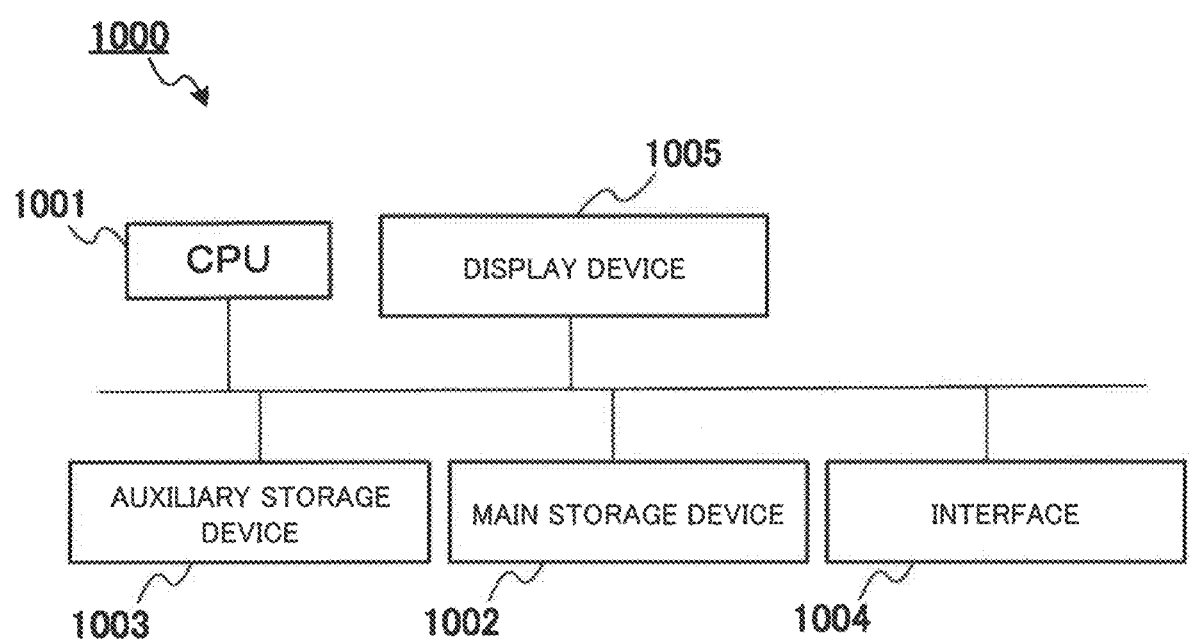
FIG. 11 is a schematic block diagram illustrating a configuration example of a computer according to an example embodiment of the present invention.

Next, a configuration example of a computer according to an example embodiment of the present invention is described. FIG. 11 is a schematic block diagram illustrating a configuration example of a computer according to the example embodiment of the present invention. A computer 1000 includes a CPU 1001, a main storage device 1002, an auxiliary storage device 1003, an interface 1004, and a display device 1005.

A part of the packet-train reception unit 210 (a portion for acquiring a delay increase amount D(i)), the lower-limit-expansion-ideal-curve generation unit 220, the in-range-ideal-curve generation unit 230, the upper-limit-expansion-ideal-curve generation unit 240, the ideal-curve selection unit 250, and the available-bandwidth estimation unit 260 in the above-described communication system may be mounted in the computer 1000 operating as an unillustrated available-bandwidth estimation apparatus, for example. In this case, operations of these respective units may be stored in the auxiliary storage device 1003 in the form of a program. The CPU 1001 reads the program from the auxiliary storage device 1003, deploys the program in the main storage device 1002, and executes predetermined processing in the above-described example embodiment in accordance with the program.

The auxiliary storage device 1003 is an example of a non-transitory tangible medium. As other examples of the non-transitory tangible medium, there are a magnetic disk, a magneto-optical disk, a CD-ROM, a DVD-ROM, a semiconductor memory, and the like to be connected via the interface 1004. Further, when the program is distributed to the computer 1000 by a communication line, the computer 1000 which receives the distribution may deploy the program in the main storage device 1002, and execute predetermined processing in the above-described example embodiment.

Further, the program may be a program for implementing a part of predetermined processing in the above-described example embodiment. Further, the program may be a difference program for implementing predetermined processing in the above-described example embodiment by combination with another program already stored in the auxiliary storage device 1003.

Further, a part of elements of the computer 1000 may be omitted depending on a processing content in the example embodiment. For example, when an estimated value of an available bandwidth is output to another server and the like connected via a network, the display device 1005 may be omitted. Further, although illustration is omitted in FIG. 11, the computer 1000 may include an input device for receiving an input of an instruction or a setting value from a user.

Further, a part or the entirety of respective constituent elements of respective apparatus is implemented by a general-purpose or dedicated circuit (Circuitry), a processor, and the like, or combination of these elements. These elements may be constituted of a single chip, or may be constituted of a plurality of chips to be connected via a bus.

Further, a part or the entirety of respective constituent elements of respective apparatus may be implemented by combination of the above-described circuit and the like, and the program.

When a part or the entirety of respective constituent elements of respective apparatus is implemented by a plurality of information processing devices, a circuit, and the like, the plurality of information processing devices, the circuit, and the like may be collectively disposed or may be distributed. For example, an information processing device, a circuit, and the like may be implemented as a configuration in which a client-and-server system, a cloud computing system, and the like are respectively connected via a communication network.

Second Example Embodiment

Figure 12:
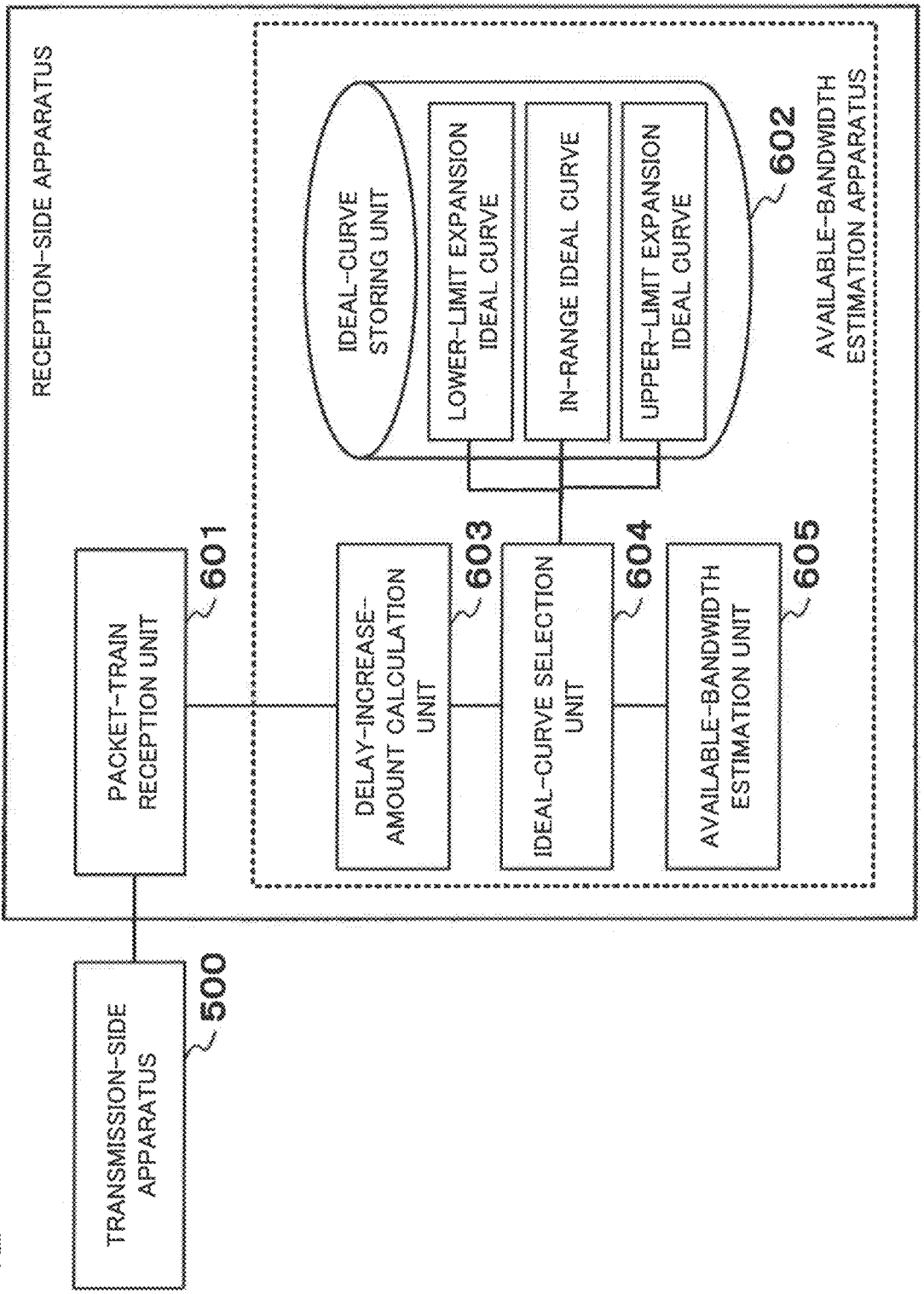
FIG. 12 is a block diagram illustrating an overview of a communication system according to the present invention.
Figure 14:
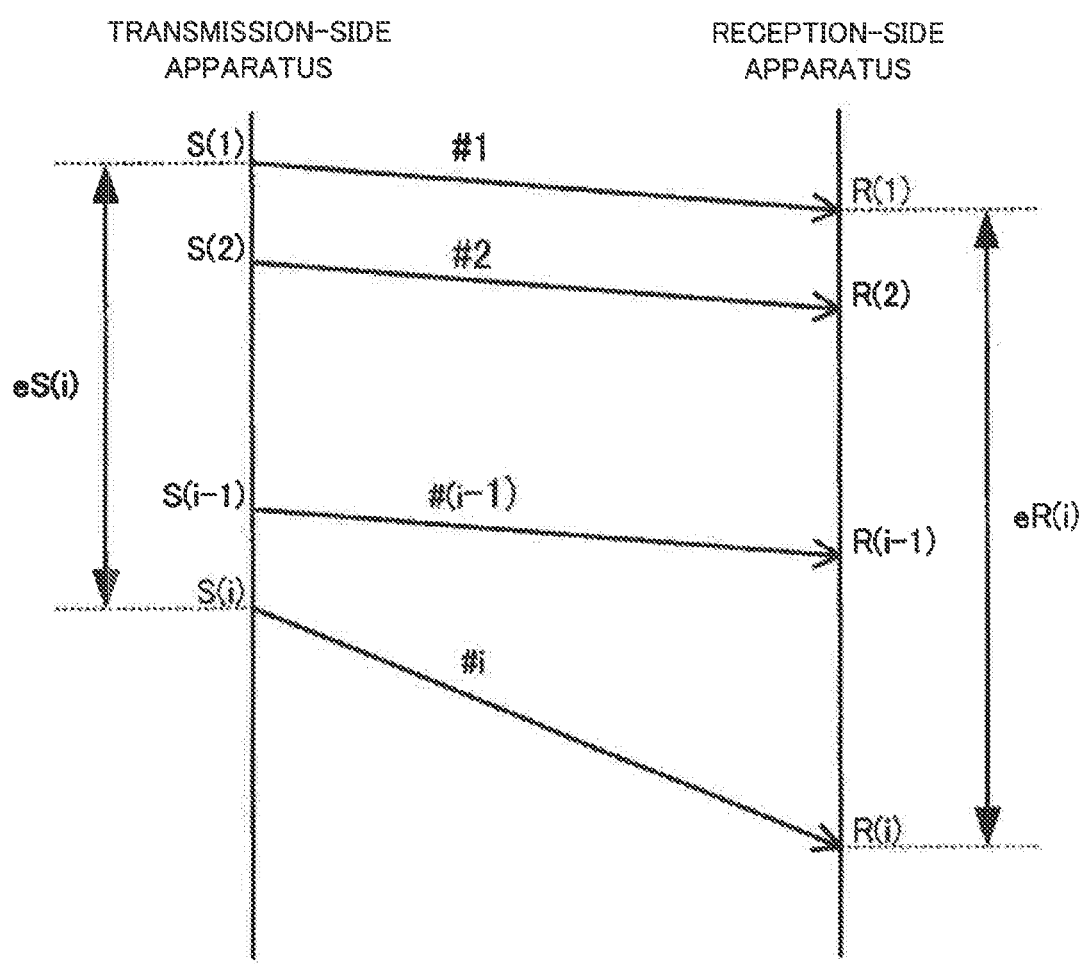
FIG. 14 is a sequence diagram illustrating the method described in PTL 1.

Next, an overview of a communication system and an available-bandwidth estimation apparatus in a second example embodiment, which is a basic example embodiment of the present invention, is described. FIG. 12 is a block diagram illustrating a configuration example of a communication system in the present example embodiment. As illustrated in FIG. 12, a communication system according to the present example embodiment includes a transmission-side apparatus 500 and a reception-side apparatus 600.

The transmission-side apparatus 500 (e.g. the transmission-side apparatus 100) transmits a packet train composed of a plurality of estimation packets for estimating an available bandwidth.

Further, the reception-side apparatus 600 includes a packet-train reception unit 601, an ideal-curve storing unit 602, a delay-increase-amount calculation unit 603, an ideal-curve selection unit 604, and an available-bandwidth estimation unit 605.

The packet-train reception unit 601 (e.g. the packet-train reception unit 210) receives a packet train.

The ideal-curve storing unit 602 (e.g. the data storing unit 270) stores information indicating one or more lower-limit-expansion-ideal-curves expressing an increase tendency of a delay occurring in an estimation packet by using a queuing delay, when a true value of the available bandwidth falls below a transmission rate range being a range of a transmission rate of an estimation packet; information indicating one or more in-range-ideal-curves expressing an increase tendency of a delay occurring in an estimation packet by using a serialization delay and a queuing delay, when a true value of the available bandwidth falls within the transmission rate range; and information indicating one or more upper-limit-expansion-ideal-curves expressing an increase tendency of a delay occurring in an estimation packet by using a serialization delay, when a true value of the available bandwidth falls above the transmission rate range.

The delay-increase-amount calculation unit 603 (e.g. the packet-train reception unit 210) calculates an actual amount of increase in delay occurring in respective estimation packets, based on a reception time of an estimation packet.

The ideal-curve selection unit 604 (e.g. the ideal-curve selection unit 250) selects an ideal curve most similar to an increase tendency of a delay indicated by the calculated amount of increase in delay from among the lower-limit-expansion-ideal-curve, the in-range-ideal-curve, and the upper-limit-expansion-ideal-curve.

The available-bandwidth estimation unit 605 (e.g. the available-bandwidth estimation unit 260) estimates an available bandwidth, based on a selection result on an ideal curve.

Further, the lower-limit expansion ideal curve may be an ideal curve which expresses an ideal increase tendency of a queuing delay occurring in respective estimation packets, and which is calculated, when it is assumed that a virtual packet whose packet number is zero or a minus number is not actually transmitted but is virtually transmitted, as a packet train, and a queuing delay starts to occur in one of the packets, based on a virtual transmission rate of the one packet.

Further, the upper-limit expansion ideal curve may be an ideal curve which expresses an ideal increase tendency of a serialization delay occurring in respective estimation packets, and which is calculated, when it is assumed that a virtual packet whose packet number is larger than a tail packet is not actually transmitted but is virtually transmitted, as a packet train, and a queuing delay starts to occur in one of the packets, based on a virtual transmission rate of the one packet.

The in-range ideal curve may be an ideal curve acquired by, when it is assumed that a queuing delay starts to occur in one of estimation packets within a packet train, combining an ideal increase tendency of a serialization delay occurring in an estimation packet before the one packet, and an ideal increase tendency of a queuing delay occurring in an estimation packet after the one packet.

Further, the packet train is composed of a plurality of estimation packets in which a transmission interval is equal distant, and a size of an estimation packet gradually increases. In all ideal curves, an increment of delay with respect to a one-way delay of a head packet of the estimation packet may be expressed by a linear function, a quadratic function, or combination of these functions with respect to a packet number of the estimation packet.

Further, the lower-limit expansion ideal curve is an ideal curve in which an increase tendency of only a queuing delay occurring in an estimation packet is expressed by using a quadratic function. The available-bandwidth estimation unit may perform quadratic regression with respect to an increase amount of a delay actually occurring in respective estimation packets, and acquire an estimated value of an available bandwidth, when a selected ideal curve is the lower-limit expansion ideal curve.

Further, the upper-limit expansion ideal curve is an ideal curve in which an increase tendency of only a serialization delay occurring in an estimation packet is expressed by using a linear function. The available-bandwidth estimation unit may perform linear regression with respect to an increase amount of a delay actually occurring in respective estimation packets, and acquire an estimated value of an available bandwidth, when a selected ideal curve is the upper-limit expansion ideal curve.

Further, the available-bandwidth estimation apparatus in the present example embodiment is an available-bandwidth estimation apparatus for estimating an available bandwidth, based on information indicating a configuration of a packet train composed of a plurality of estimation packets for estimating an available bandwidth, and information on a reception time of respective estimation packets when a packet train is received; and may include the above-described ideal-curve storing unit 602, the above-described delay-increase-amount calculation unit 603, the above-described ideal-curve selection unit 604, and the above-described available-bandwidth estimation unit 605.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

According to the present invention, since it is possible to enhance estimation accuracy of an available bandwidth without increasing a number of packets within a packet train or minutely setting a transmission rate, the present invention is applicable to various types of communication systems in which estimation of an available bandwidth is intended in a short period and with a low load.

REFERENCE SIGNS LIST 100, 500 Transmission-side apparatus
200, 600 Reception-side apparatus
300 Network
110 Packet-train transmission unit
120 Packet-train generation unit
210 Packet-train reception unit
220 Lower-limit-expansion-ideal-curve generation unit
230 In-range-ideal-curve generation unit
240 Upper-limit-expansion-ideal-curve generation unit
250 Ideal-curve selection unit
260 Available-bandwidth estimation unit
270 Data storing unit
601 Packet-train reception unit
602 Ideal-curve storing unit
603 Delay-increase-amount calculation unit
604 Ideal-curve selection unit
605 Available-bandwidth estimation unit
1000 Computer
1001 CPU
1002 Main storage device
1003 Auxiliary storage device
1004 Interface
1005 Display device

The invention claimed is:
1. A communication system comprising:
a transmission-side apparatus that transmits a packet train composed of a plurality of estimation packets for estimating an available bandwidth; and
a reception-side apparatus that receives the packet train, wherein
the reception-side apparatus includes:
a memory; and
at least one processor coupled to the memory,
the processor performing operation, the operations comprising:
for receiving the packet train;
storing
information indicating one or more lower-limit-expansion-ideal-curves expressing an increase tendency of a delay occurring in the estimation packet by using a queuing delay, when a true value of the available bandwidth falls below a transmission rate range being a range of a transmission rate of the estimation packet,
information indicating one or more in-range-ideal-curves expressing an increase tendency of a delay occurring in the estimation packet by using a serialization delay and a queuing delay, when a true value of the available bandwidth falls within the transmission rate range, and
information indicating one or more upper-limit-expansion-ideal-curves expressing an increase tendency of a delay occurring in the estimation packet by using a serialization delay, when a true value of the available bandwidth falls above the transmission rate range;
calculating an actual amount of increase in delay occurring in the respective estimation packets, based on a reception time of the estimation packet;
selecting an ideal curve most similar to the increase tendency of a delay indicated by the calculated amount of increase in delay, from among the lower-limit-expansion-ideal-curve, the in-range-ideal-curve, and the upper-limit-expansion-ideal-curve; and
estimating the available bandwidth, based on a selection result on the ideal curve.

2. The communication system according to claim 1, wherein
the lower-limit-expansion-ideal-curve is an ideal curve that expresses an ideal increase tendency of a queuing delay occurring in the respective estimation packets to be calculated based on a virtual transmission rate of one of the packets, when it is assumed that a virtual packet that has a packet number of zero or a packet number of minus is not actually transmitted but is virtually transmitted, as the packet train, and a queuing delay starts to occur in one of the packets.

3. The communication system according to claim 1, wherein
the upper-limit-expansion-ideal-curve is an ideal curve that expresses an ideal increase tendency of a serialization delay occurring in the respective estimation packets to be calculated based on a virtual transmission rate of the one of the packets, when it is assumed that a virtual packet that has a packet number larger than a tail packet is not actually transmitted but is virtually transmitted, as the packet train, and a queuing delay starts to occur in one of the packets.

4. The communication system according to claim 1, wherein
the in-range-ideal-curve is an ideal curve that is acquired by combining an ideal increase tendency of a serialization delay occurring in the estimation packet before the one on the packets, and an ideal increase tendency of a queuing delay occurring in the estimation packet after the one of packets, when it is assumed that a queuing delay starts to occur in one of the estimation packets within the packet train.

5. The communication system according to claim 1, wherein
the packet train is composed of a plurality of the estimation packets in that a transmission interval is equal distant, and a size of the estimation packet gradually increases, and
an increment of delay with respect to a one-way delay of a head packet, of the estimation packet, with respect to a packet number of the estimation packet, is expressed by a linear function, a quadratic function, or a combination of these functions in all ideal curves.

6. The communication system according to claim 1, wherein
the lower-limit-expansion-ideal-curve is an ideal curve expressing an increase tendency of only a queuing delay occurring in the estimation packet by using a quadratic function, and
the operations further comprises
performing quadratic curve regression with respect to an amount of increase in delay actually occurring in the respective estimation packets, and acquiring an estimated value of the available bandwidth, when a selected ideal curve is the lower-limit-expansion-ideal-curve.

7. The communication system according to claim 1, wherein
the upper-limit-expansion-ideal-curve is an ideal curve expressing an increase tendency of only a serialization delay occurring in the estimation packet by using a linear function, and
the operations further comprises
performing linear regression with respect to an amount of increase in delay actually occurring in the respective estimation packets, and acquiring an estimated value of an available bandwidth, when a selected ideal curve is the upper-limit expansion ideal curve.

8. An available-bandwidth estimation method for an information processing device, the method comprising:
storing
information indicating one or more lower-limit-expansion-ideal-curves expressing an increase tendency of a delay occurring in an estimation packet by using a queuing delay, when a true value of the available bandwidth falls below a transmission rate range being a range of a transmission rate of the estimation packet included in a packet train composed of a plurality of estimation packets for estimating an available bandwidth,
information indicating one or more in-range-ideal-curves expressing an increase tendency of a delay occurring in the estimation packet by using a serialization delay and a queuing delay, when a true value of the available bandwidth falls within the transmission rate range, and
information indicating one or more upper-limit-expansion-ideal-curves expressing an increase tendency of a delay occurring in the estimation packet by using a serialization delay, when a true value of the available bandwidth falls above the transmission rate range,
selecting an ideal curve most similar to the increase tendency of a delay occurring in the estimation packet indicated by an actual amount of increase in delay occurring in the respective estimation packets to be calculated based on a reception time of the estimation packet, from among the lower-limit-expansion-ideal-curve, the in-range-ideal-curve, and the upper-limit-expansion-ideal-curve; and
estimating the available bandwidth, based on a selection result on the ideal curve.

9. A non-transitory computer-readable recording medium embodying an available-bandwidth estimation program, the available-bandwidth estimation program causing a computer to perform a method, the method comprising:
storing
information indicating one or more lower-limit-expansion-ideal-curves expressing an increase tendency of a delay occurring in an estimation packet by using a queuing delay, when a true value of the available bandwidth falls below a transmission rate range being a range of a transmission rate of the estimation packet included in a packet train composed of a plurality of estimation packets for estimating an available bandwidth,
information indicating one or more in-range-ideal-curves expressing an increase tendency of a delay occurring in the estimation packet by using a serialization delay and a queuing delay, when a true value of the available bandwidth falls within the transmission rate range, and
information indicating one or more upper-limit-expansion-ideal-curves expressing an increase tendency of a delay occurring in the estimation packet by using a serialization delay, when a true value of the available bandwidth falls above the transmission rate range;
selecting an ideal curve most similar to the increase tendency of a delay occurring in the estimation packet indicated by an actual amount of increase in delay occurring in the respective estimation packets to be calculated based on a reception time of the estimation packet, from among the lower-limit-expansion-ideal-curve, the in-range-ideal-curve, and the upper-limit-expansion-ideal-curve; and
estimating the available bandwidth, based on a selection result on the ideal curve.

* * * * *